United States Patent [19]

Nakajima et al.

[11] Patent Number: 5,307,387
[45] Date of Patent: Apr. 26, 1994

[54] FUEL LOADING METHOD AND REACTOR CORE

[75] Inventors: Akinobu Nakajima, Hitachi; Motoo Aoyama, Mito; Kunitoshi Kurihara, Katsuta, all of Japan

[73] Assignee: Hitachi, Ltd., Tokyo, Japan

[21] Appl. No.: 918,596

[22] Filed: Jul. 24, 1992

[30] Foreign Application Priority Data

Jul. 24, 1991 [JP] Japan .................. 3-184867
Mar. 17, 1992 [JP] Japan .................. 4-60703

[51] Int. Cl.⁵ .................. G21C 19/20; G21C 5/12
[52] U.S. Cl. .................. 376/267
[58] Field of Search .................. 376/267, 349, 435

[56] References Cited

U.S. PATENT DOCUMENTS

| | | | |
|---|---|---|---|
| 4,285,769 | 8/1981 | Specker et al. | 376/267 |
| 4,378,329 | 3/1983 | Uchikawa et al. | 376/435 |
| 4,460,538 | 7/1984 | Yamashita | 376/267 |
| 4,574,069 | 3/1986 | Ross et al. | 376/267 |
| 5,093,070 | 3/1992 | Koyama et al. | 376/267 |

FOREIGN PATENT DOCUMENTS

| | | |
|---|---|---|
| 54-1786 | 1/1979 | Japan . |
| 56-87891 | 7/1981 | Japan . |
| 58-131589 | 8/1983 | Japan . |
| 60-13283 | 1/1985 | Japan .................. 376/267 |
| 62-96889 | 5/1987 | Japan .................. 376/267 |

Primary Examiner—Daniel D. Wasil
Attorney, Agent, or Firm—Antonelli, Terry, Stout & Kraus

[57] ABSTRACT

In a fuel loading method for a reactor core made up by high burn-up fuel, fuel assemblies loaded in a circumferential zone of the core are shuffled between two layers of the circumferential zone until residing in the core for two cycles and, after residing for two cycles, are moved to the fourth layer of the circumferential zone from an outermost layer of the core, thereby reducing the difference in exposure due to a different radial power level in the vicinity of the core boundary. Those fuel assemblies are moved to control cells in a central zone of the core after residing in the circumferential zone for three cycles, and also such fuel assemblies as having resided in the central zone for three cycles are moved to the core outermost layer, thereby reducing the difference in exposure between the fuel assemblies having resided in the central zone and the fuel assemblies having resided in the circumferential zone due to different power levels in the central and circumferential zones. As a result, the difference in exposure between used fuel assemblies is reduced.

29 Claims, 18 Drawing Sheets

MOVEMENT OF 3-CYCLE RESIDING FUEL ASSEMBLIES (FROM CIRCUMFERENTIAL ZONE)

MOVEMENT OF 3-CYCLE RESIDING FUEL ASSEMBLIES (FROM CENTRAL ZONE)

MOVEMENT OF 2-CYCLE RESIDING FUEL ASSEMBLIES

MOVEMENT OF 1-CYCLE RESIDING FUEL ASSEMBLIES

F I G. 5
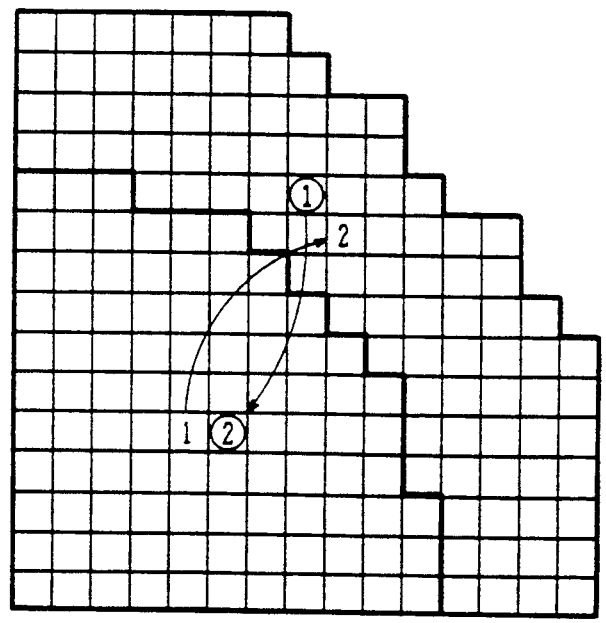

CORE CENTER (1/4 OF CORE)

FIG. 16(a)
MOVEMENT OF 3-CYCLE RESIDING FUEL ASSEMBLIES (TO CONTROL CELL)
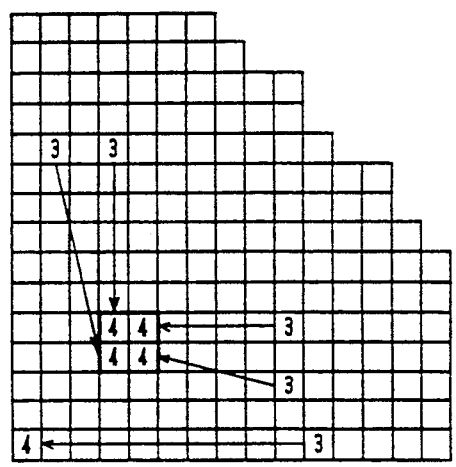
FIG. 16(b)
MOVEMENT OF 3-CYCLE RESIDING FUEL ASSEMBLIES (TO OUTERMOST LAYER)
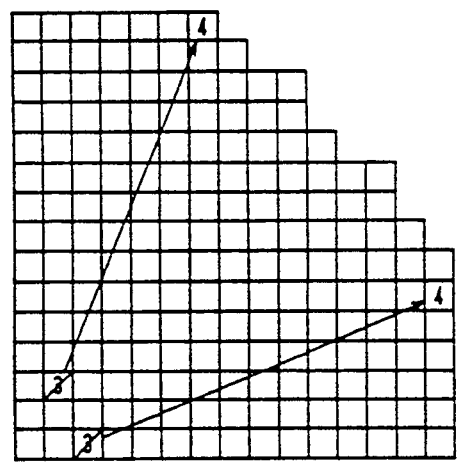
FIG. 16(c) MOVEMENT OF 4-CYCLE RESIDING FUEL ASSEMBLIES
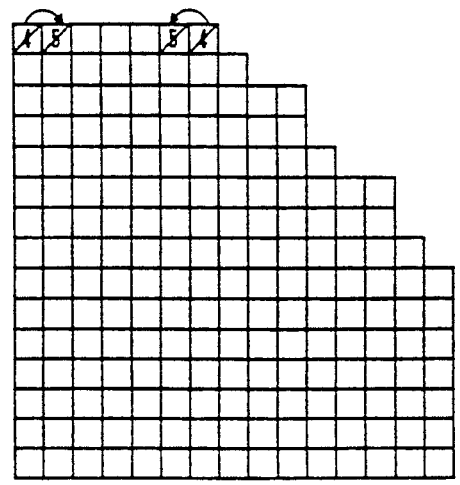

FIG. 17(a)
MOVEMENT OF 3-CYCLE RESIDING FUEL ASSEMBLIES
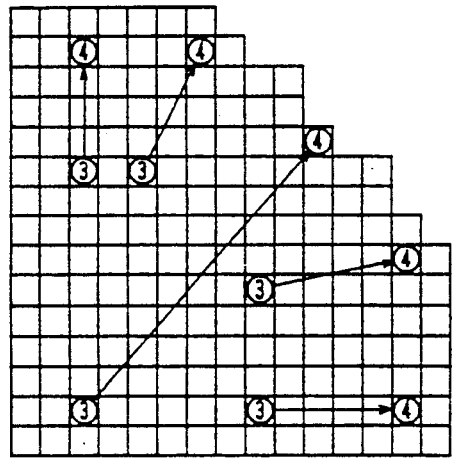
FIG. 17(b)
MOVEMENT OF 2-CYCLE RESIDING FUEL ASSEMBLIES
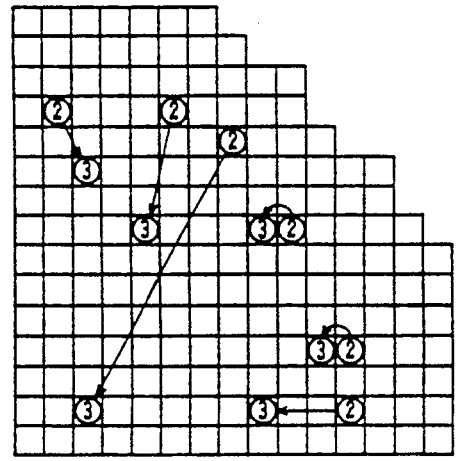
FIG. 17(c) MOVEMENT OF 1-CYCLE RESIDING FUEL ASSEMBLIES
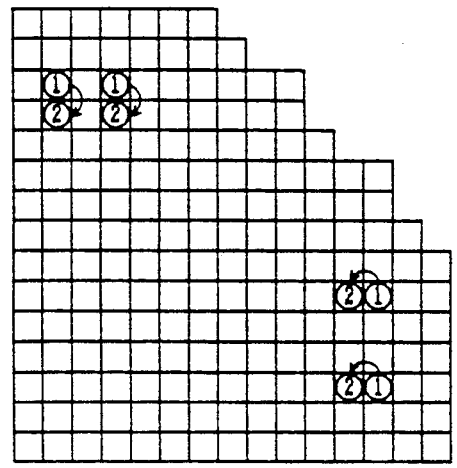

FUEL LOADING METHOD AND REACTOR CORE

BACKGROUND OF THE INVENTION

The present invention relates to a fuel loading method for reactor cores, and more particularly to a fuel loading method suitable for a core made up by high burn-up fuels as well as to a reactor core constructed by such fuel loading method.

A core of a boiling water reactor is constructed by arraying fuel assemblies in the form of a rectangular lattice. Within the core, there are mixedly present fuel assemblies which are different in residence period (or the number of residence cycles) from one another. During each period of periodical inspection of a reactor, approximately $\frac{1}{4}$ to $\frac{1}{3}$ of total fuel assemblies (used fuel assemblies) in the core is usually replaced with fresh ones. Depending on the number of residence cycles, the fuel assemblies are also different in exposure and neutron infinite multiplication factor from one another. Accordingly, the fuel assemblies loaded in a core position of interest would have different powers, even if the fuel assemblies surrounding this fuel assembly are arrayed under the same conditions. In a usual core, to easily meet thermal limiting conditions for the core operation, a core unit cell is made up by four fuel assemblies adjacent to the position where a cross-shaped control rod is inserted, and those fuel assemblies making up each core unit cell are made different in the number of residence cycles from one another.

In conventional cores, it is general to load those fuel assemblies having the maximum number of residence cycles at the outermost periphery of the core, and load other fuel assemblies having the different numbers of residence cycles inside the outermost periphery of the core in an evenly dispersed manner. The resulting evened radial power distribution across the core is flat in an inner region of the core, but distorted to a large extent in an outer region of the core due to the presence of the core boundary. Accordingly, if the fuel assemblies arranged in the outer region of the core remain there, those fuel assemblies would be discharged out of the core before reaching a target degree of discharge exposure, with the result of poor fuel economy. In general, therefore, the fuel assemblies loaded in the outer region of the core are appropriately moved within the core (called fuel shuffling) so that all the fuel assemblies discharged out of the core may reach a target degree of discharge exposure as near as practicable. The fuel shuffling is performed during periodical inspection periods after shutdown of the reactor.

JP, A, 56-87891 discloses a conventional fuel loading method comtemplating that the core radial power distribution is distorted in the outer region of the core. In order that burnable poison contained in the fuel assemblies loaded in a circumferential zone of the core is completely burned up while leaving no burnable poison and the loss of excess reactivity is not caused, the disclosed prior art proposes to divide the core into a central zone and a circumferential zone, and load fresh fuel assemblies in the third layer from the outermost layer of the circumferential zone. After residing for one operation cycle, those fuel assemblies loaded in the third layer are moved to the second layer from the outermost layer for the purpose of making the core radial power distribution more flat.

SUMMARY OF THE INVENTION

As explained above, the prior arts are generally designed to load the fuel assemblies having the different numbers of residence cycles in an evenly dispersed manner and to perform the fuel shuffling periodically, so that the fuel assemblies discharged out of the core may reach a target degree of discharge exposure as near as practicable. With a future increase in exposure of fuel assemblies, however, the difference in exposure between the fuel assemblies loaded in the inner region of the core and the fuel assemblies loaded in the outer region will be increased more than conventionally even if they have the same number of residence cycles. In other words, the difference in exposure between the fuel assemblies discharged out of the core (i.e., exposure variations) will be enlarged.

In the core disclosed in the above-cited JP, A, 56-87891, fresh fuel assemblies and those fuel assemblies after residing for one cycle are loaded in the third and second layers from the outermost layer, respectively, for the purpose of reducing the loss of reactivity due to the effect of burnable poison and making the core radial power distribution more flat. However, no considerations are focused on how to reduce the difference in exposure between the fuel assemblies loaded in the inner region of the core and the fuel assemblies loaded in the outer region thereof. More specifically, in the disclosed prior art, those fuel assemblies after residing in the circumferential zone of the core for two cycles are moved to both the outermost layer of the core and the fourth layer from the outermost layer. As a result, a non-negligible difference in discharge exposure would be produced between the fuel assemblies loaded in the circumferential region of the core and the fuel assemblies loaded in the central region of the core. Thus, the difference in discharge exposure between the fuel assemblies, which are discharged out of the core becomes larger.

The larger difference in discharge exposure between the fuel assemblies implies that fissile materials contained in the used fuel assemblies of small discharge exposure are less effectively utilized than those contained in the used fuel assemblies of large discharge exposure. This leads to a problem of degrading fuel economy.

An object of the present invention is to provide a fuel loading method for reactor cores which can reduce the difference in discharge exposure and thus can improve fuel economy, as well as a reactor core constructed by the fuel loading method.

To achieve the above object, in accordance with the present invention, there is provided a fuel loading method wherein those fuel assemblies having resided in a core circumferential zone for at least two cycles are taken out of said core circumferential zone, and said taken-out fuel assemblies are loaded in a core central zone surrounded by said core circumferential zone. More specifically, there is provided a fuel loading method for a reactor core having a core central zone including a plurality of first fuel assemblies that remain at the same loaded positions for at least two successive cycles, and a core circumferential zone including a plurality of second fuel assemblies that are changed in loaded positions for each of at least two successive cycles, said method comprising (a) a first step of taking out said second fuel assemblies having resided in said core circumferential zone for at least two cycles; and (b)

a second step of moving said taken-out second fuel assemblies to said core central zone.

The above fuel loading method preferably further comprises (c) a third step of moving said second fuel assemblies having resided in a first area of two layers adjacent to each other in said core circumferential zone for one cycle to a second area of said two layers. In this case, preferably, said second fuel assemblies having resided in said two layers adjacent to each other for two cycles are moved to an inner layer adjacent to said two layers in said core circumferential zone.

In the above fuel loading method, preferably, said second fuel assemblies having resided in one of two layers adjacent to each other in said core circumferential zone for one cycle are moved to the other of said two layers. In this case, preferably, the one of said two layers is an outer layer of said two layers and the other of said two layers is an inner layer of said two layers.

In the above fuel loading method, more preferably, said second fuel assemblies having resided in said second area for one cycle are moved to a third area of said two layers. In this case, preferably, said first and third areas are located in the inner layer of said two layers and said second area is located in the outer layer of said two layers.

In a core having a plurality of control cells formed in said core central zone, preferably, said second fuel assemblies are moved to said control cells. In this case, preferably, the above fuel loading method further comprises a step of moving said first fuel assemblies having resided in said core central zone for three cycles to a core outermost layer.

The above fuel loading method preferably further comprises a step of moving said first fuel assemblies having resided in said central zone for three cycles to said core outermost layer and an inner layer adjacent to said core outermost layer.

On the other hand, in the above fuel loading method, said second step preferably includes a step of dispersedly loading said second fuel assemblies in said core central zone.

In a core having a plurality of control cells formed in said core central zone, the above fuel loading method preferably further comprises a step of moving a part of said first fuel assemblies having resided in said core central zone for three cycles to said control cells, and moving the remaining to said core outermost layer.

Further, in a core having a plurality of control cells formed in said core central zone, the above fuel loading method preferably further comprises a step of moving a part of said first fuel assemblies having resided in said core central zone for three cycles to said control cells, and moving the remaining to said core outermost layer, and a step of moving said second fuel assemblies having been dispersedly loaded in said core central zone in said second step and having resided in said core central zone for one cycle to an outer layer adjacent to said two layers in said core circumferential zone.

To achieve the above object, in accordance with the present invention, there is also provided a fuel loading method for a reactor core having a core central zone including a plurality of first fuel assemblies that remain at the same loaded positions for at least two successive cycles, and a core circumferential zone including a plurality of second fuel assemblies that are changed in loaded positions for each of at least two successive cycles, wherein said second fuel assemblies are moved from said core circumferential zone to said core central zone so that a ratio of maximum discharge exposure to mean discharge exposure is not higher than 1.08.

To achieve the above object, in accordance with the present invention, there is further provided a reactor core comprising a core central zone including a plurality of control cells, and a core circumferential zone surrounding said core central zone and including a plurality of fuel assemblies that are changed in loaded positions for at least two successive cycles.

The principles of the invention will be explained below.

Because of a reactor core being finite, the profile of a core radial power distribution (i.e., change in a radial power) is distorted to a large extent in the vicinity of the core boundary. Due to the distorted profile of core radial power distribution and the difference in infinite multiplication factor between fuel assemblies, depending on the number of operation cycles that they have experienced, if the fuel assemblies loaded in the core circumferential zone remain at the same positions, there would occur:

(a) the difference in exposure due to a different radial power level in the vicinity of the core boundary (i.e., in the core circumferential zone); and (b) the difference in exposure between the fuel assemblies having resided in the core central zone and the fuel assemblies having resided in the circumferential zone due to different radial power levels between the core central zone and the core circumferential zone.

As a result, the large difference in exposure is produced between the fuel assemblies discharged out of the core. Based on the above findings, the present invention is intended to reduce the aforesaid exposure differences (a) and (b) to reduce the difference in discharge exposure between fuel assemblies.

In order to reduce the aforesaid exposure differences (a) and (b), the present invention employs the following basic procedures: (A) To reduce the aforesaid exposure difference (a) between the fuel assemblies loaded in the core circumferential zone, those fuel assemblies loaded in the core circumferential zone are caused to reside in the core circumferential zone for at least two cycles (preferably the first and second cycles after being loaded in the core); and (B) To reduce the aforesaid exposure difference (b), the fuel assemblies having resided in the core circumferential zone in which a radial power level is lower than the core central zone, are caused to move and reside in the core central zone which has a higher radial power level.

In the aforesaid basic procedure (A), contemplating the profile of radial power distribution in the core circumferential zone, it is preferable to make the fuel assemblies reside at the positions spaced from the core center through substantially the same distance so that there will not occur a large difference in the radial power level.

Also, in the basic procedure (A), it is important to make the fuel assemblies loaded in the core circumferential zone reside in the core circumferential zone for at least two cycles (preferably while changing the loaded positions). If those fuel assemblies are moved to the core central zone after residing in the core circumferential zone for only one cycle, it would be difficult to reduce the difference in discharge exposure between fuel assemblies, because gadolinia ($Gd_2O_3$) added as a neutron absorber to suppress excessive reactivity of the core is burnt and change in infinite multiplication factor of the fuel assemblies when subjected to the 1st and 2nd cycle operations after being loaded in the core is large.

As to the aforesaid basic procedure (B), the mean infinite multiplication factor of the control cells is lower in the core central zone, but the radial power level in the control cells is relatively high as a level for those fuel assemblies which have experienced three cycles in the core circumferential zone before moving to the core central zone and start to experience the 4th cycle operation in the core central zone. Accordingly, the control cells or the other locations are selected as the positions in the core central zone to which the fuel assemblies are to be moved, depending on the number of cycles experienced.

Besides the aforesaid basic procedures, the present invention selectively employs additional procedures below for the purpose of reducing the aforesaid exposure difference (b) from the side of the fuel assemblies loaded in the core central zone:

(C) The fuel assemblies having resided in the core central zone with a higher radial power level are moved to an outermost layer of the core with a minimum radial power level, or a layer located inwardly of the core outermost layer by one layer; and (D) The fuel assemblies having resided in the core central zone with a higher radial power level are moved to the control cells with a lower radial power level.

The present invention is based on the concepts mentioned above. The operation of the present invention will be described below in order.

With the present invention, making the second fuel assemblies loaded in the core circumferential zone reside in the core circumferential zone for at least two successive cycles in the first step corresponds to the aforesaid basic procedure (A), thereby reducing the difference in exposure due to a different radial power level in the vicinity of the core boundary (or in the core circumferential zone), i.e., the aforesaid exposure difference (a). Also, the second step of moving the second fuel assemblies to the core central zone after residing in the core circumferential zone corresponds to the aforesaid basic procedure (B), thereby reducing the difference in exposure between the fuel assemblies having resided in the core central zone and the fuel assemblies having resided in the circumferential zone due to different radial power levels between the core central zone and the core circumferential zone, i.e., the aforesaid exposure difference (b). Consequently, the present invention enables a reduction in the exposure difference between the fuel assemblies which are discharged out of the core.

As a result of evaluating the difference in discharge exposure of the fuel assemblies in terms of a ratio of maximum discharge exposure to mean discharge exposure, it has proved that the ratio can be not higher than 1.08 according to the present invention. For comparison, the ratio obtained by the fuel loading method disclosed in the above-cited JP, A, 56-87891 is approximately 1.10. The reason is as follows. In the disclosed prior art, for the purpose of reducing the loss of excess reactivity due to the effect of burnable poison and making the core radial power distribution more flat, fresh fuel assemblies and those fuel assemblies after residing for one cycle are loaded in the third and second layers from the outermost layer of the core circumferential zone, followed by moving to the outermost layer of the core circumferential zone and the fourth layer from the outermost layer, respectively. Thus, the disclosed prior art lacks for the procedure corresponding to the above (B) and cannot reduce the aforesaid exposure difference (b). On the contrary, with the present invention, it is possible to reduce the difference in discharge exposure of the fuel assemblies, thereby improving fuel economy.

Further, by moving the second fuel assemblies having resided in the first area of the two layers adjacent to each other in the core circumferential zone for one cycle to the second area of the two layers, the second fuel assemblies are loaded at the positions spaced from the core center through substantially the same radial distance, which reduces the difference in exposure between the fuel assemblies loaded in the core circumferential zone in the first and second cycles.

In this connection, by moving the second fuel assemblies having resided in the two layers adjacent to each other for two cycles to the inner layer adjacent to the two layers in the core circumferential zone, the difference in exposure between the fuel assemblies loaded in the core circumferential zone is further reduced. The reason is as follows. The inner layer adjacent to the two layers locates near the core central zone and has a relatively high power level. By moving those fuel assemblies, which have the exposure difference so small as not to develop bipolarization, to the zone with a relatively high radial power level and causing them to reside there for one cycle, the difference in exposure between the fuel assemblies is reduced through the burning in such a period of one cycle, thereby further reducing the difference in discharge exposure.

Further, by moving the second fuel assemblies having resided in one of the two layers adjacent to each other in the core circumferential zone for one cycle to the other of the two layers, the radial power level averaged in each of the two layers can be assumed substantially equal and, therefore, the difference in exposure between the fuel assemblies loaded in the core circumferential zone is necessarily reduced.

Moreover, by moving the second fuel assemblies residing in the core circumferential zone to control cells in the core central zone, the aforesaid exposure difference (b) is reduced because the radial power level in the control cells is relatively high as a level for the fuel assemblies having the number of cycles to be moved there.

The third step of moving the first fuel assemblies having resided in the core central zone for three cycles to the core outermost layer corresponds to the aforesaid additional procedure (C), thereby further reducing the difference in discharge exposure between the fuel assemblies. This is equally applied to the case of moving the first fuel assemblies having resided in the central zone for three cycles to the core outermost layer and the second layer from the core outermost layer.

On the other hand, by dispersedly loading the second fuel assemblies having resided in the core circumferential zone into the core central zone, the aforesaid exposure difference (b) is reduced because the radial power level in the core central zone is higher.

The step of moving a part of the first fuel assemblies having resided in the core central zone for three cycles to the control cells, and moving the remaining to the core outermost layer corresponds to the aforesaid additional procedures (C) and (D), thereby further reducing the difference in discharge exposure between the used fuel assemblies.

In this connection, by moving the second fuel assemblies having been dispersedly loaded in the core central zone and having resided in the core central zone for one cycle to the outer layer adjacent to the two adjacent layers, the aforesaid exposure difference (b) is further reduced and so is the difference in exposure between the fuel assemblies.

Additionally, the step of moving the first fuel assemblies having resided in the core central zone for three cycles to the control cells corresponds to the aforesaid additional procedure (D), thereby further reducing the difference in discharge exposure between the fuel assemblies.

In this connection, by moving the second fuel assemblies having been dispersedly loaded in the core central zone and having resided in the core central zone for one cycle to the core outermost layer, the aforesaid exposure difference (b) is further reduced and so is the difference in discharge exposure between the fuel assemblies.

BRIEF DESCRIPTION OF THE DRAWINGS

FIG. 5 is a diagram for explaining fuel shuffling in which the fuel assemblies loaded in a circumferential zone of the core is moved to a central zone of the core after residing for one cycle.

FIG. 16(a)-16(c) are diagrams showing an outline of fuel shuffling in a central zone of the core according to the third embodiment shown in FIG. 15.

FIG. 17(a)-17(c) are diagrams showing an outline of fuel shuffling in a circumferential zone of the core according to the third embodiment shown in FIG. 15.

DETAILED DESCRIPTION OF THE PREFERRED EMBODIMENTS

Preferred embodiments of the present invention will be hereinafter described.

First Embodiment

To begin with, a first embodiment of the present invention will be explained with reference to FIGS. 1 to 14.

Figure 1:
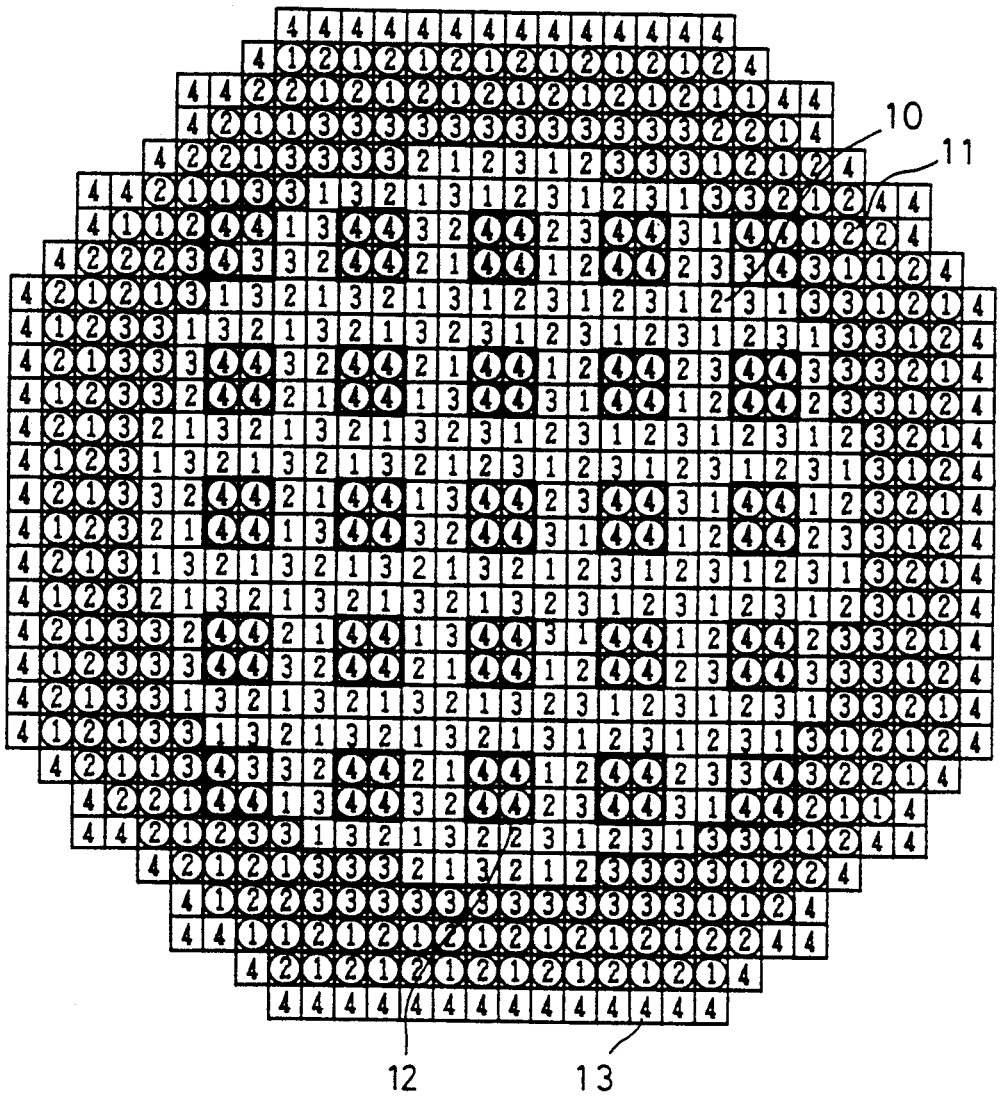
FIG. 1 is a diagram showing a fuel loading pattern during some operation cycle of a reactor core according to a first embodiment of the present invention.

FIG. 1 shows a fuel loading pattern during some operation cycle of a reactor core constructed by a fuel loading method according to this first embodiment when it is applied to a boiling water reactor. The term "one operation cycle" or "a cycle" is used here to mean a period from start-up of a reactor after the fuel exchange to shutdown of the reactor for the next fuel exchange. In FIG. 1, each rectangular box represents one fuel assembly (hereinafter referred to simply as "fuel"), and the numeral put in each box represents the number of residence cycles. Specifically, the numeral 1 indicates those fuel assemblies which are in the first cycle after being loaded in the core (hereinafter referred to as "1st cycle fuel"), the numeral 2 indicates those fuel assemblies which are in the second cycle after being loaded in the core (hereinafter referred to as "2nd cycle fuel"), the numeral 3 indicates those fuel assemblies which are in the third cycle after being loaded in the core (hereinafter referred to as "3rd cycle fuel"), and the numeral 4 indicates those fuel assemblies which are in the fourth cycle after being loaded in the core (hereinafter referred to as "4th cycle fuel"). At the end of one operation cycle, the 1st cycle fuels become fuel assemblies which have experienced the operation of one cycle (hereinafter referred to as "1-cycle residing fuel"), the 2nd cycle fuels become fuel assemblies which have experienced the operation of two cycles (hereinafter referred to as "2-cycle residing fuel"), the 3rd cycle fuels become fuel assemblies which have experienced the operation of three cycles (hereinafter referred to as "3-cycle residing fuel"), and the 4th cycle fuels become fuel assemblies which have experienced the operation of four cycles (hereinafter referred to as "4-cycle residing fuel"), respectively. In this embodiment, the 4-cycle residing fuels are taken out of the reactor core. In a next operation cycle, the 1-cycle residing fuels, the 2-cycle residing fuels and the 3-cycle residing fuels turn to the 2nd cycle fuels, the 3rd cycle fuels and the 4th cycle fuels, respectively. Further, of the numerals put in the rectangular boxes, those ones which are not encircled by ○ each indicate the number of residence cycles of the fuel assemblies which have been loaded in a central zone (described later) of the core in the state of fresh fuel assemblies (corresponding to exposure of 0 GWd/t), while those ones which are encircled by ○ each indicate the number of residence cycles of the fuel assemblies which have been loaded in a circumferential zone (described later) of the core in the state of fresh fuel assemblies. Fat lines in the core central zone each represent the boundary of a control cell.

In this embodiment, the present invention is applied to a core of a boiling water reactor. In the boiling water reactor, the core is constructed by arranging a number of fuel assemblies as shown in FIG. 1. The core has a plurality of cells each comprising four fuel assemblies which are positioned adjacent to one another and around the position where a control rod of a cross-shape in cross-section is inserted. These cells include first and second cells. The second cells have a mean infinite multiplication factor smaller than the first cells, and are called control cells. The control cells are denoted by reference numeral 12 in FIG. 1.

The core of this embodiment is set to have the batch number of 4.0, and includes a core central zone 10 in which the loaded positions of fuel assemblies remain unchanged for successive three cycles, and a core circumferential zone 11 in which the loaded positions of fuel assemblies are changed for each of successive three cycles. In the area of the core central zone 10 other than the control cells 12, as shown in FIG. 1, there are loaded the 1st to 3rd cycle fuels, 100 in number for each cycle, in an evenly dispersed manner. Also, 25 control cells 12 are formed in the core central zone 10. These control cells 12 are arrayed in a matrix of 5 rows×5 columns. No control cells 12 are formed in the core circumferential zone. Because fuel rods in the control cells exhibit a small extent of power increase in the operation of withdrawing control rods, those control rods which serve to control the reactor power during the power operation of the reactor are inserted to the respective control cells 12. As to the first cells which have a mean infinite multiplication factor larger than the control cells, control rods are fully inserted during shutdown of the reactor (and fully withdrawn during the power operation of the reactor). During shutdown of the reactor, the control rods are fully inserted in the control cells 12 as well. In each of the control cells 12 except for those four control cells 12 which are positioned at four corners of the control cell matrix of 5 rows×5 columns, there are loaded four 4th cycle fuels moved from the core circumferential zone 11. In each of those four control cells 12 positioned at the four corners, there are loaded three 4th cycle fuels moved from the core circumferential zone 11 and one 3rd cycle fuel moved from the core central zone 10.

In the core circumferential zone 11 other than an outermost layer 13 of the core, the 1st to 3rd cycle fuels, 92 in number for each cycle, are loaded. More specifically, the 3rd cycle fuels, 92 in number, are loaded in the fourth layer from the core outermost layer 13 so as to surround the core central zone 10. The 1st (fresh) and 2nd cycle fuels, 92 in number for each cycle, are alternately loaded in each of the second and third layers from the core outermost layer 13 half and half so as to surround the core central zone 10. In the core outermost layer 13, there are loaded the 4th cycle fuels, 92 in number, moved from the core central zone 10. The 1st to 4th cycle fuels loaded in the core circumferential zone 11 are respectively at positions radially spaced from the core center through substantially the same distances.

Figure 2A:
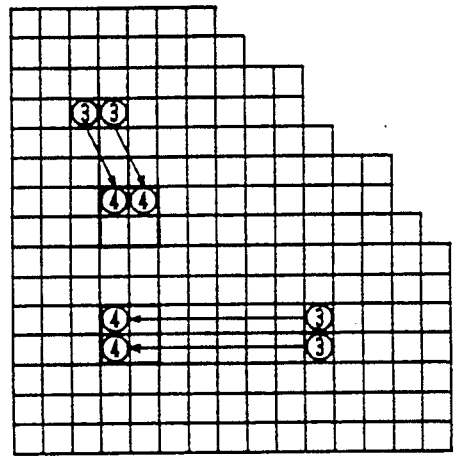
FIG. 2(a)-2(d) are diagrams showing an outline of fuel shuffling according to the first embodiment of the present invention.
Figure 2B:
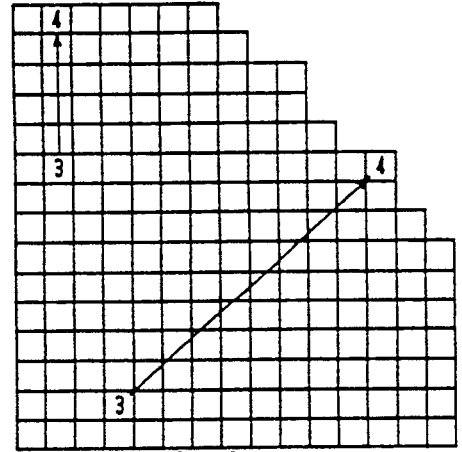

A fuel loading method according to this embodiment, which is performed after the end of one operation cycle, will be next described. At the end of the operation in that cycle, the 1st to 4th cycle fuels shown in FIG. 1 turn to the 1-cycle residing fuel, the 2-cycle residing fuel, the 3-cycle residing fuel, and the 4-cycle residing fuel, respectively. First, the 4-cycle residing fuels are discharged out of the reactor core. Then, the 3-cycle residing fuels shown in FIG. 1 are shuffled as follows:

(1) The 3-cycle residing fuels in the core circumferential zone 11 are moved to the control cells 12 formed in the core central zone 10 (see FIG. 2(a)); and (2) The 3-cycle residing fuels in the core central zone 10 are moved to the core outermost layer 13 (see FIG. 2(b)).

Figure 2C:
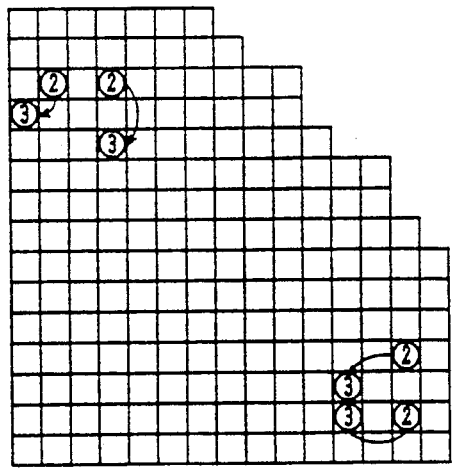
Figure 2D:
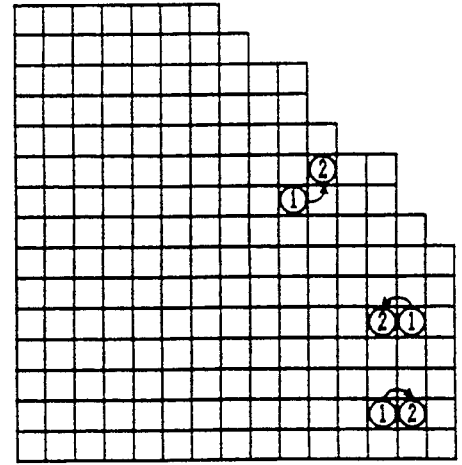

These 3-cycle residing fuels are moved to the positions where the 4-cycle residing fuels have existed, and become 4th cycle fuels in the next operation cycle. Further, the 1-cycle and 2-cycle residing fuels in the core circumferential zone 11 are shuffled as follows:

(3) The 2-cycle residing fuels in the core circumferential zone 11 are moved to the positions where the 3-cycle residing fuels have existed in the core circumferential zone 11 (see FIG. 2(c)); and (4) The 1-cycle residing fuels in the core circumferential zone 11 are moved to the positions where the 2-cycle residing fuels have existed in the core circumferential zone 11 (see FIG. 2(d)), At the positions where the 3-cycle residing fuels have existed in the core central zone 10 and the positions where the 1-cycle residing fuels have existed in the core circumferential zone 11, there are loaded fresh fuel assemblies which become 1st cycle fuels. The 1-cycle residing fuels and the 2-cycle residing fuels in the core central zone 10 remain at the same loaded positions. Thus, the fresh fuel assemblies loaded in the core central zone 10 remain at the same positions for successive three cycles. On the contrary, the fresh fuel assemblies loaded in the core circumferential zone 11 are changed in their loaded positions for successive three cycles.

By so performing the fuel shuffling, the same fuel loading pattern as shown in FIG. 1 is obtained for the next operation cycle. The core of FIG. 1 resulted from the above fuel shuffling comprises the core central zone 10 including the plurality of first cells and the plurality of control cells 12, and the core circumferential zone 11 surrounding the core central zone 10 and including the first cells, but not the control cells 12.

The following is a description about the operation of this embodiment.

First, the principles of reducing the difference in discharge exposure between discharged fuel assemblies according to the fuel loading method of this embodiment will be explained.

This invention is intended to, on the basis of the novel findings, reduce the exposure differences (a) and (b) explained above to reduce the difference in discharge exposure between fuel assemblies.

In order to reduce the aforesaid exposure differences (a) and (b), the present invention employs the basic procedures (A) and (B) explained above. In other words, those fuel assemblies which have resided in the core circumferential zone 11 for at least two cycles are moved to the core central zone 10.

Besides the aforesaid basic procedures, this embodiment uses the before-mentioned additional procedures (C) and (D) for the purpose of further reducing the aforesaid exposure difference (b) from the side of the fuel assemblies loaded in the core central zone.

In the aforesaid basic procedure (A) used in this embodiment, contemplating the profile of radial power distribution in the core circumferential zone, the fuel assemblies are caused to reside at the positions spaced from the core center through substantially the same distance so that there will not occur a large difference in the radial power level.

Also, in the basic procedure (A), it is desirable to make the fuel assemblies loaded in the core circumferential zone reside in the core circumferential zone for at least two cycles like this embodiment. If those fuel assemblies are moved to the core central zone after residing in the core circumferential zone for only one cycle, the difference in discharge exposure between the fuel assemblies could not be sufficiently reduced. The reason will now be explained with reference to FIGS. 4 and 5.

Figure 4:
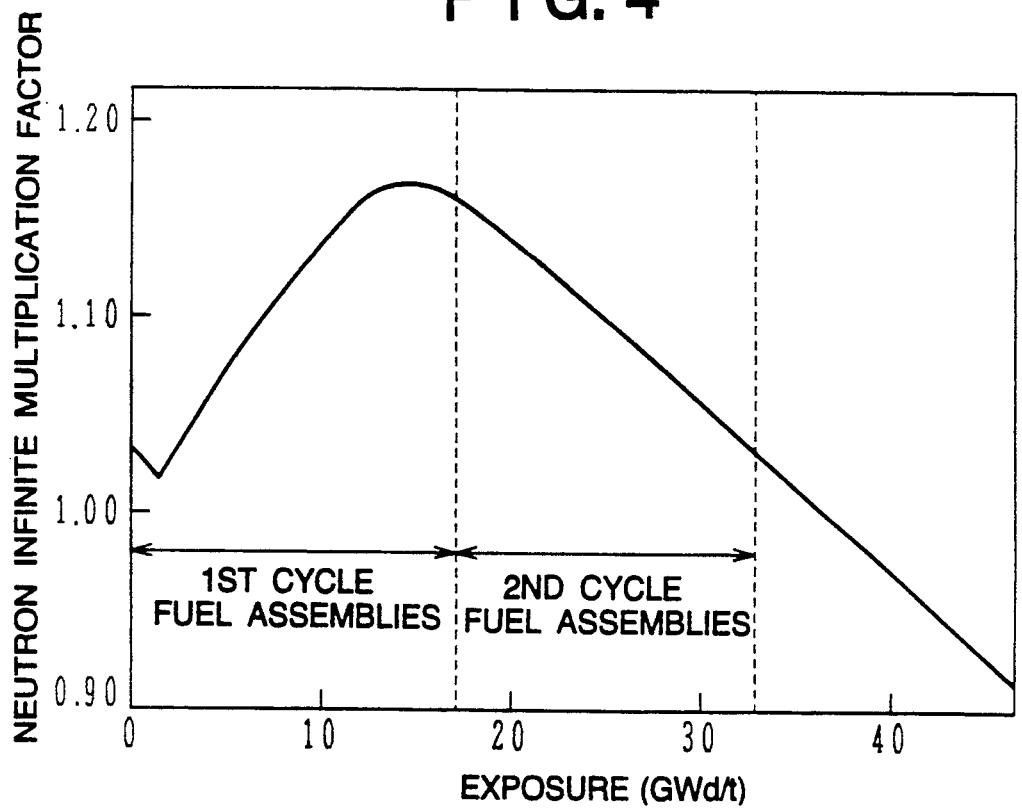
FIG. 4 is a graph showing change in infinite multiplication factor with respect to exposure of fuel assemblies.

FIG. 4 shows change in neutron infinite multiplication factor of fuel assemblies versus exposure as resulted from calculating a void fraction on an assumption that the core mean void fraction is 40%. Generally, fuel assemblies include gadolinia ($Gd_2O_3$) as a neutron absorber to suppress excessive reactivity of the core. Therefore, with the progress in burning of fresh fuel assemblies, i.e., the 1st cycle fuel, the gadolinia contained therein is reduced and the infinite multiplication factor is increased correspondingly. Then, after the gadolinia is burnt up, the infinite multiplication factor is decreased with depletion of the fissile materials. In other words, the infinite multiplication factor is relatively large until the 2nd cycle fuel, and the 1st and 2nd cycle fuels are subjected to large different changes in infinite multiplication factor.

Let now assume such a fuel loading method that, as shown in FIG. 5, the 1-cycle residing fuel in the core circumferential zone is moved to the core central zone, and the 1-cycle residing fuel in the core central zone is moved to the core circumferential zone. This method produces a large difference in the progress of burning of the fuel assemblies. The reason is in that the infinite multiplication factors of the 1st and 2nd cycle fuels are large, and changes in infinite multiplication factor of these fuel assemblies are different to a large extent from each other, which results in large different degrees of neutron importance depending on the radial loaded positions across the core.

With regards to the aforesaid basic procedure (B), the control cells 12 represent areas where a power level is relatively low in the core central zone. However, when the 3-cycle residing fuel having a reduced infinite multiplication factor after residing in the core circumferential zone 10 is moved to the control cell 12 in the core central zone 11, this shuffling enables the fissile materials to be more effectively utilized than would be the case of moving that 3-cycle residing fuel to another location in the core circumferential zone 10. This greatly contributes to a reduction in the exposure difference between the fuel assemblies. For the above reason, the control cells 12 in the core central zone 10 are selected as the positions where the fuel assemblies having resided in the core circumferential zone are loaded to experience the last cycle in their service life.

This embodiment is to put the foregoing concepts into practice. The operation of this embodiment will be described below with reference to FIGS. 3 and 6-9.

Figure 3:
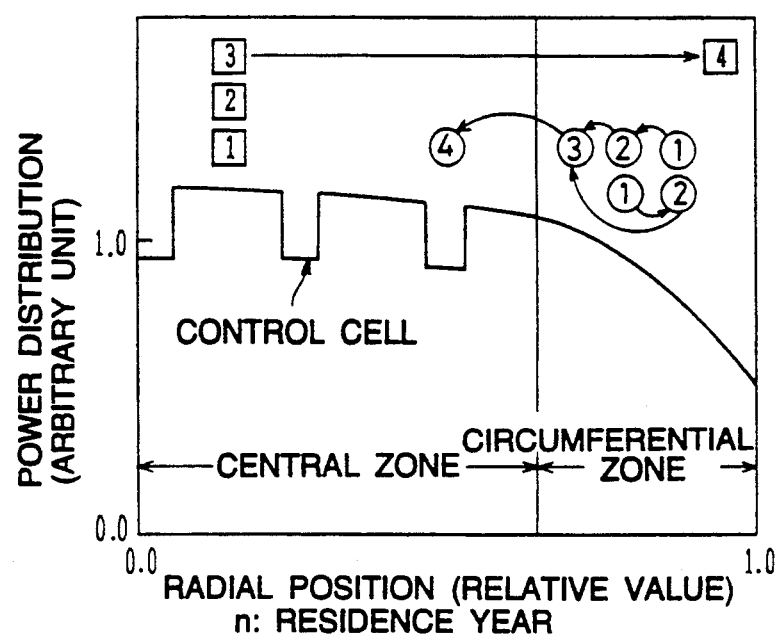
FIG. 3 is a graph showing radial power distribution across a core.

First, in FIG. 3, a relative power level of the core central zone 10, including the control cells 12, is about 1.2 and a relative power level of the core outermost layer 13 is about 0.4. Therefore, if fuel assemblies are shuffled to the core outermost layer after residing in the core central zone 10 for three cycles without fuel shuffling, exposure of the fuel assemblies reaches approximately 4.0 (corresponding to a cycle increment exposure of 1.0). On the other hand, relative power levels of the core circumferential zone 11 are about 0.9, 1.1 and 1.2 for the second, third and fourth layers from the core outermost layer 13, respectively, and a relative power level of the control cells 12 in the core central zone 10 is about 0.9. Therefore, if the fuel assemblies initially loaded in the second layer from the outermost layer of the core circumferential zone 11 are successively shuffled to the third layer and then to the fourth layer for each one operation cycle and, further shuffled to the control cells 12 after residing in the core circumferential zone 11 for three cycles, exposure of these fuel assemblies reaches approximately 4.0. Likewise, exposure of the fuel assemblies initially loaded in the third layer from the outermost layer also reaches approximately 4.0. Accordingly, the fuel assemblies discharged out of the reactor core from the core outermost layer 13 and the fuel assemblies discharged out of the reactor from the control cells 12 can be made matched in exposure with each other.

Here, the procedure of shuffling the fuel assemblies initially loaded in the second layer from the outermost layer of the core circumferential zone 11 successively to the third layer and then to the fourth layer for each one operation cycle corresponds to the aforesaid basic procedure (A), thereby reducing the difference in exposure due to a different radial power level in the vicinity of the core boundary (or in the core circumferential zone), i.e., the aforesaid exposure difference (a). Also, the above procedure of shuffling the fuel assemblies initially loaded in the core circumferential zone 11 to the control cells 12 after residing in the core circumferential zone for three cycles corresponds to the aforesaid basic procedure (B), thereby reducing the difference in exposure between the fuel assemblies having resided in the core central zone and the fuel assemblies having resided in the circumferential zone due to different radial power levels between the core central zone and the core circumferential zone, i.e., the aforesaid exposure difference (b). Further, the above procedure of shuffling the fuel assemblies having resided in the core central zone for three cycles to the core outermost layer corresponds to the aforesaid additional procedure (C), thereby further reducing the above exposure difference (b).

Figure 6:
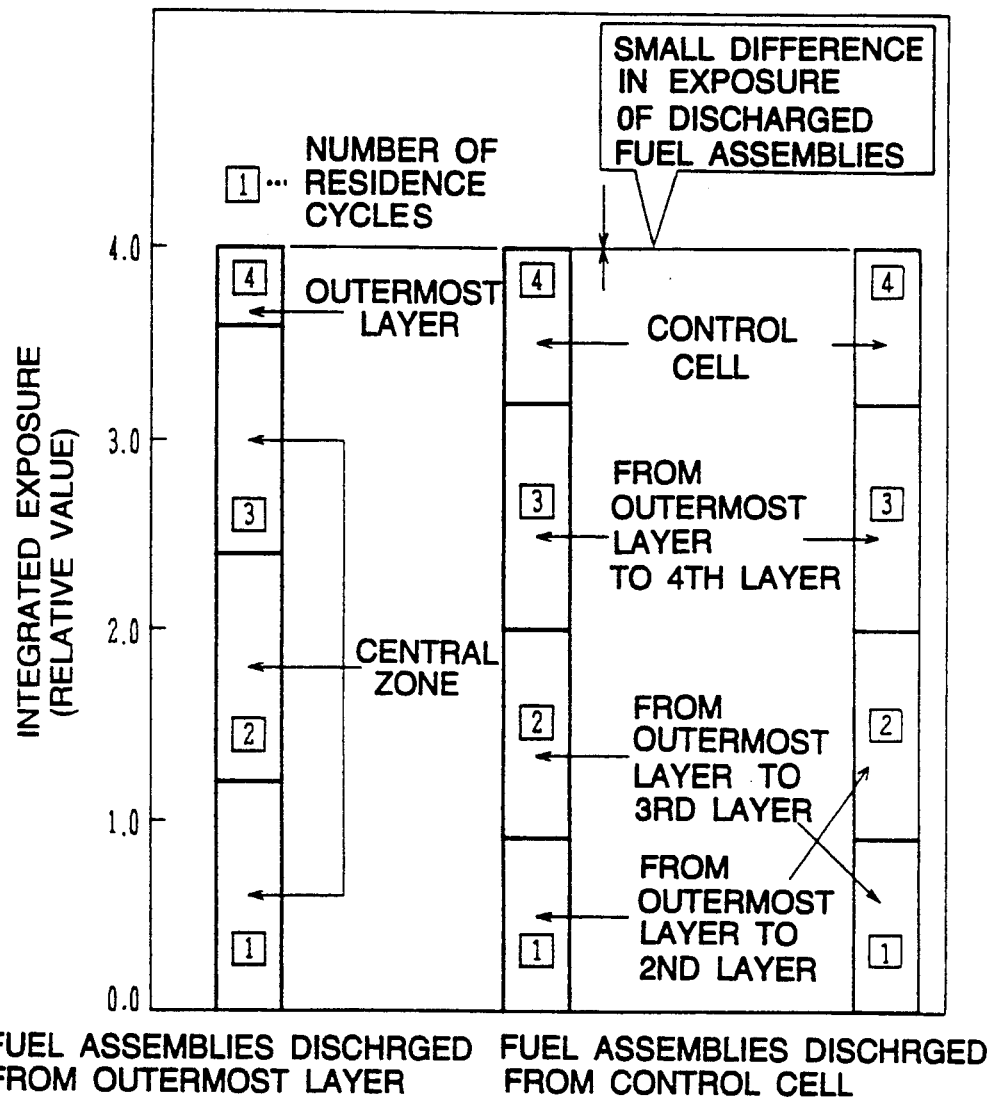
FIG. 6 is a diagram showing integrated exposure (relative value) of fuel assemblies according to the first embodiment of the present invention.

FIG. 6 shows integrated exposure of fuel assemblies. As will be seen from FIG. 6, both the fuel assemblies discharged out of the core outermost layer 13 and the fuel assemblies discharged out of the control cells 12 reach approximately 4.0 of exposure. Further, the fuel assemblies discharged out of the control cells 12 exhibit a maximum increase in exposure during residence in the fourth layer from the core outermost layer. Thus, moving all the fuel assemblies initially loaded in the core circumferential zone to the fourth layer contributes to a remarkable increase in exposure.

Next, change in the exposure difference between the fuel assemblies for each shuffling step will be explained. The fuel assemblies initially loaded in the core circumferential zone undergo the following three steps of fuel shuffling until they are taken out of the reactor:

(1) Movement of 1-cycle residing fuel (see FIG. 2(d));
(2) Movement of 2-cycle residing fuel (see FIG. 2(c)); and
(3) Movement of 3-cycle residing fuel (see FIG. 2(a)).

Figure 7:
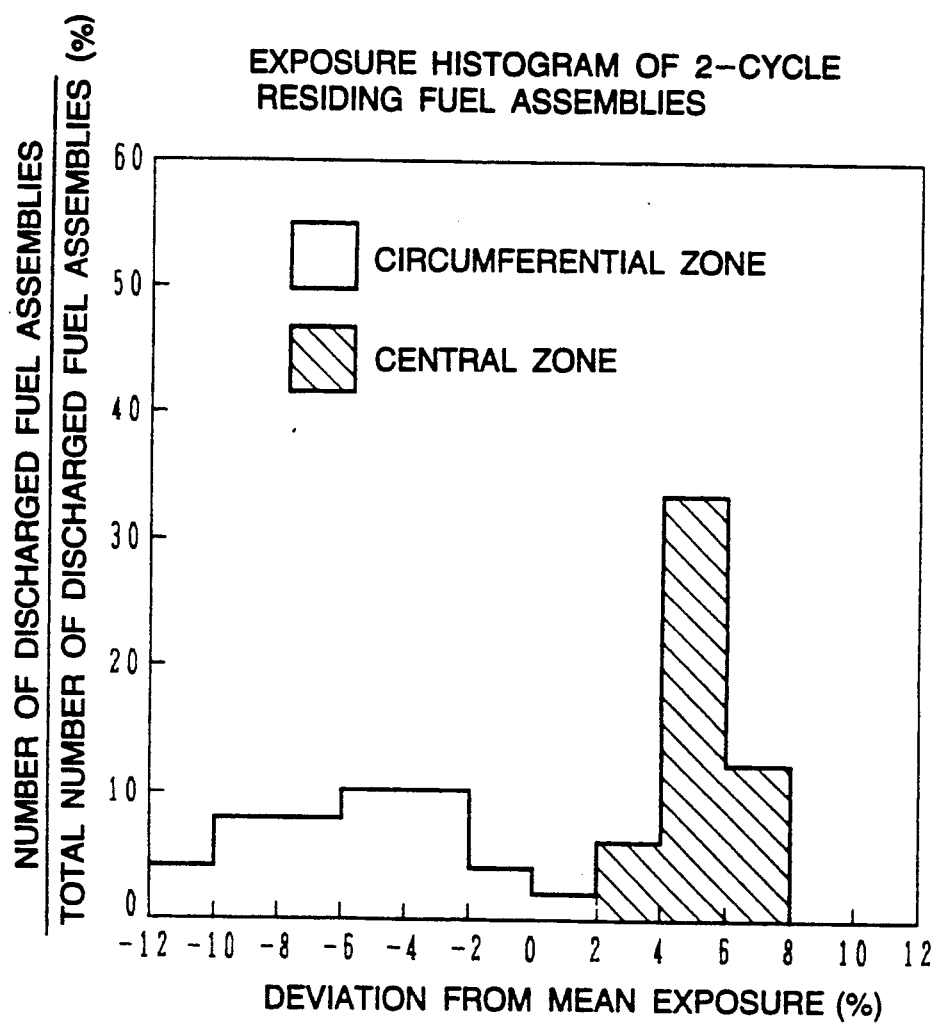
FIG. 7 is an exposure histogram of 2-cycle residing fuel assemblies according to the first embodiment of the present invention.
Figure 8:
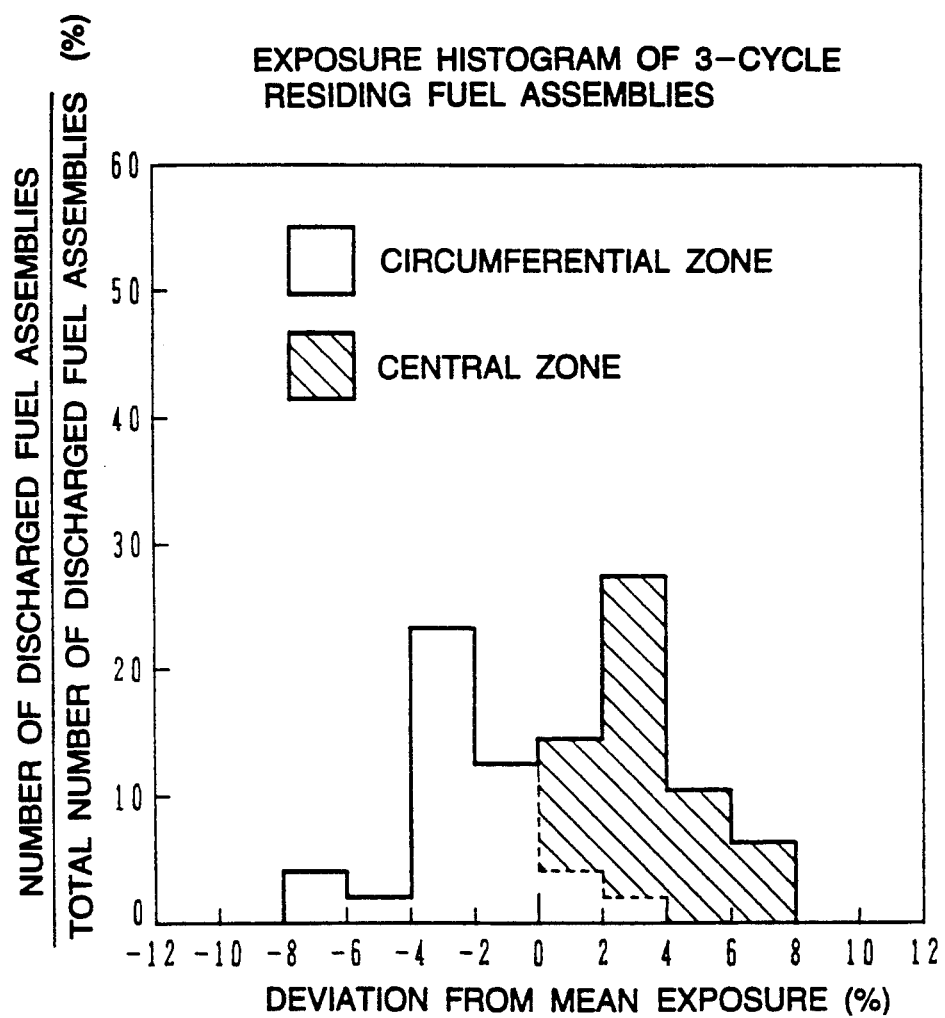
FIG. 8 is an exposure histogram of 3-cycle residing fuel assemblies according to the first embodiment of the present invention.
Figure 9:
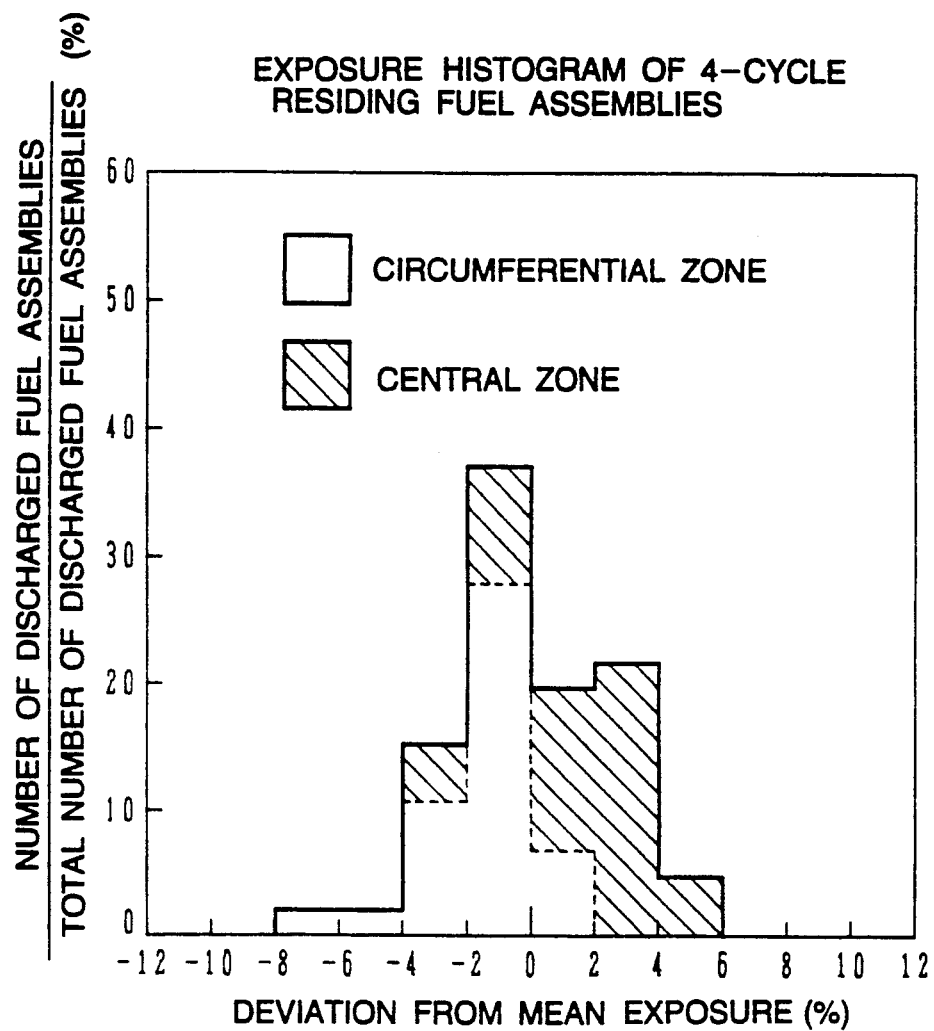
FIG. 9 is an exposure histogram of 4-cycle residing fuel assemblies according to the first embodiment of the present invention.

FIGS. 7 to 9 show exposure histograms of the 2-cycle residing fuel, 3-cycle residing fuel and 4-cycle residing fuel resulted after making the above steps (1) to (3) of fuel shuffling, respectively, and experiencing the subsequent one cycle operation. In FIGS. 7 to 9, the term "discharged fuel assemblies" means used fuel assemblies which come to the end of their service life. In each of these figures, the white or non-hatched portion represents an exposure histogram of the fuel assemblies loaded in the core circumferential zone 11, whereas the hatched portion represents an exposure histogram of the fuel assemblies loaded in the core central zone 10. Now, by calculating the difference (variations) in exposure between the fuel assemblies in terms of;

maximum value (%) of the histogram/extent (%) of the histogram the following results are obtained:
(a) For 2-cycle residing fuel (FIG. 7);

10.4 (%)/14(%)=0.74

(b) For 3-cycle residing fuel (FIG. 8);

22.9(%)/12(%)=1.91

(c) For 4-cycle residing fuel (FIG. 9); and 27.1(%)/10(%)=2.71.

The above resulting index implies that a larger value represents smaller variations in exposure between the fuel assemblies. From the calculated results, it will be found that the exposure variations between the fuel assemblies loaded in the core circumferential zone 11 are reduced with the progress of operation cycles.

Additionally, in this embodiment, since the 1st cycle fuels and the 2nd cycle fuels are mixedly arranged half and half between two layers in the core circumferential zone 11, there occur variations in exposure between the fuel assemblies after residing for two cycles, as given in the above (a). However, the variations are in such an extent as not causing bipolarization. Subsequently, by moving the fuel assemblies to the fourth layer from the outermost layer, the fourth layer having a relatively high power level, and then causing the fuel assemblies to burn in the fourth layer for one cycle, the exposure variations are largely reduced. Stated otherwise, even with the fuel assemblies moved to the positions having a higher power level, the effect of reducing the exposure variations could not be obtained if the exposure variations are too large at the time of the movement. In this embodiment, the range where the fuel assemblies are mixedly present for two cycles is limited within two layers adjacent to each other in the core circumferential zone and, therefore, the exposure variations will not be so large during the burning for two cycles. By moving the fuel assemblies to the fourth layer while suppressing an increase in the exposure variations as mentioned above, the resulting exposure difference can be made smaller.

As explained above, with this embodiment, it is possible to reduce the difference in exposure between the discharged fuel assemblies.

The effect of reducing the difference in exposure between the discharged fuel assemblies according to this embodiment will be next described by taking practical numeral values. Evaluating the exposure difference between the discharged fuel assemblies in terms of a ratio of maximum discharge exposure to mean discharge exposure (i.e., exposure peaking), the exposure peaking is reduced down to 1.06 as will be seen from FIG. 9.

Figure 10:
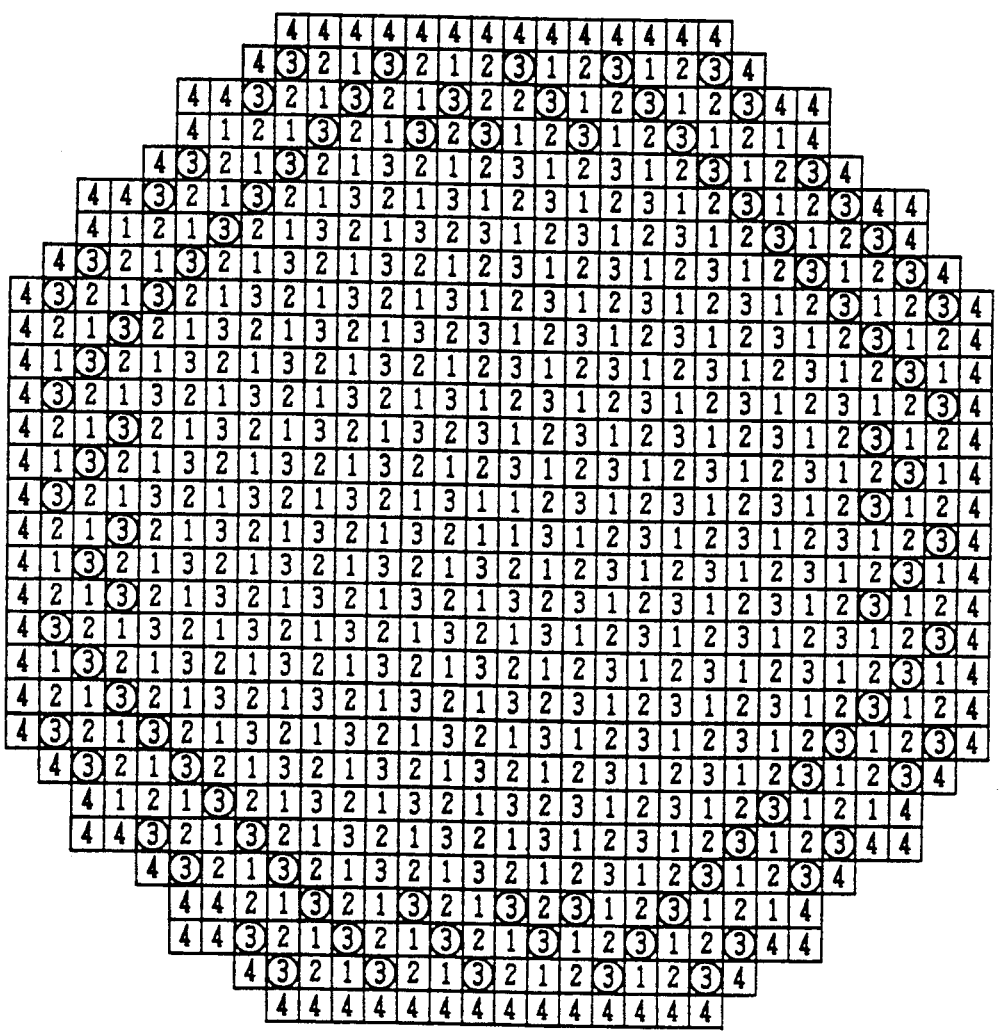
FIG. 10 is a diagram showing a fuel loading pattern in one conventional reactor core.

Meanwhile, as shown in FIG. 10, the prior art is generally designed to load those fuel assemblies having the maximum number of residence cycles in the core outermost layer, and other fuel assemblies having the smaller number of residence cycles than the maximum one inside the core outermost layer in an evenly dispersed manner. Then, those fuel assemblies of which numerals are not encircled in FIG. 10 are stayed in the core to remain unchanged for three cycles and, thereafter, are taken out of the reactor. The 3-cycle residing fuel loaded in the core circumferential zone 11 and indicated by encircled numerals 3 is moved to the outermost layer. In other words, since the radial power distribution across the core shown in FIG. 10 is distorted to a large extent in the outer region of the core due to the presence of the core boundary, the fuel assemblies are more evened in discharge exposure by causing the fuel assemblies in the core circumferential zone to burn in the outermost layer.

Figure 11:
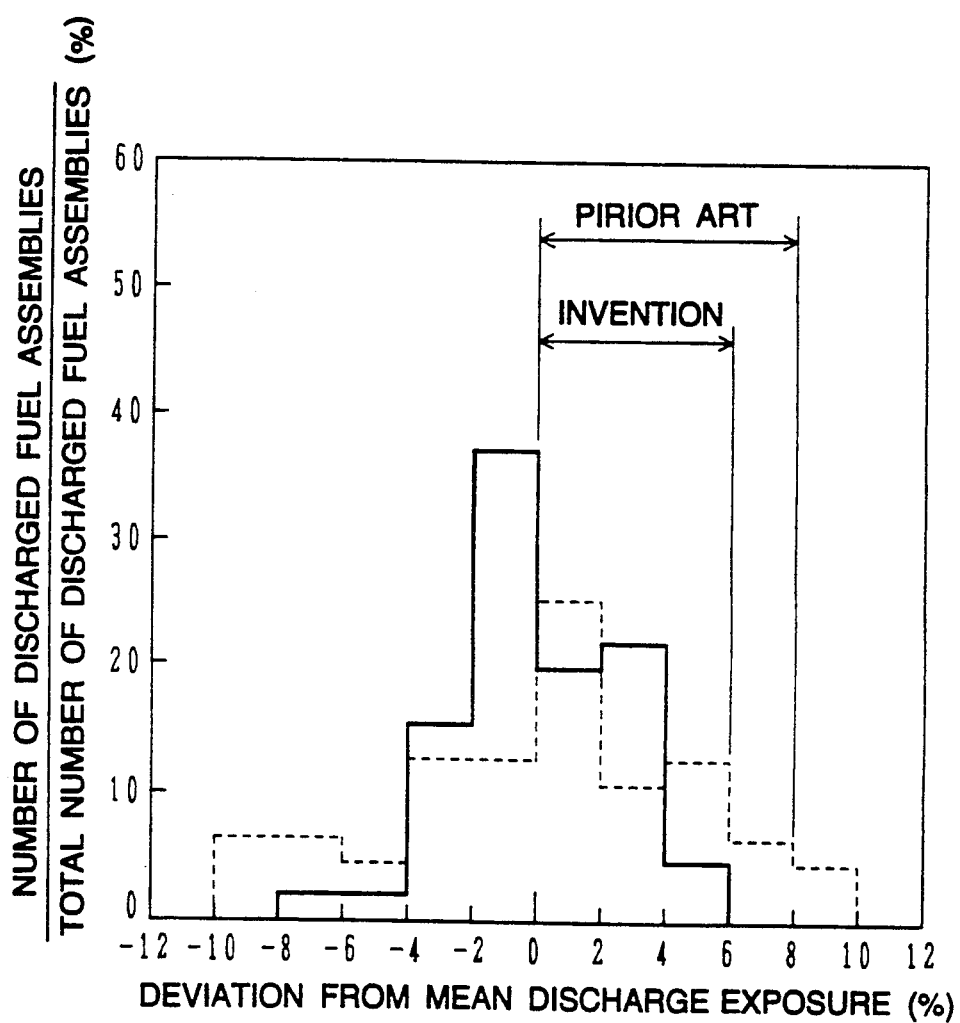
FIG. 11 is a histogram showing discharge exposure according to the fuel loading pattern shown in FIG. 10.

An exposure histogram of the used fuel assemblies according to the above prior art is shown in FIG. 11 along with that of the present invention for comparison. As will be seen from FIG. 11, the exposure peaking in the prior art becomes 1.10 which is larger than 1.06 in this embodiment.

Figure 12:
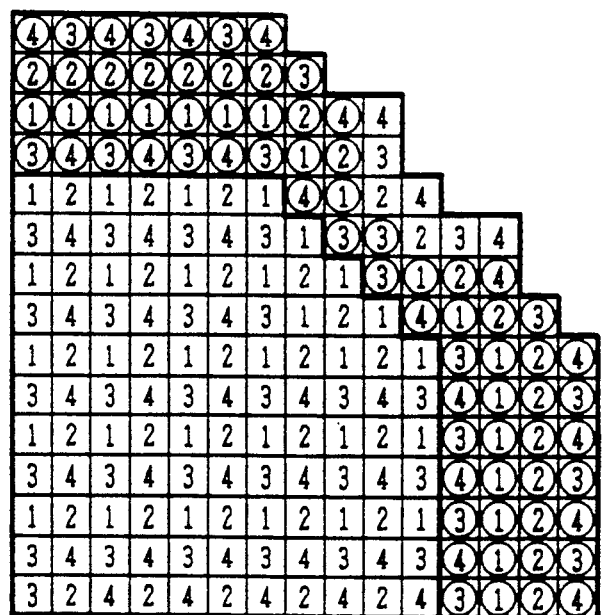
FIG. 12 is a diagram showing a fuel loading pattern in another conventional reactor core.

In the prior art as disclosed in the above-cited JP, A, 56-87891, for the purpose of reducing the loss of excess reactivity due to the effect of burnable poison and making the core power distribution more flat, fresh fuel assemblies and those fuel assemblies after residing for one cycle are loaded in the third and second layers from the outermost layer of the core circumferential zone, followed by moving to the outermost layer of the core circumferential zone and the fourth layer from the outermost layer, respectively, as shown in FIG. 12. The number of fuel assemblies to be replaced by fresh ones is 92 and the batch number of the core is 4.0. No fuel assemblies are moved from the core circumferential zone to the core central zone.

Figure 13:
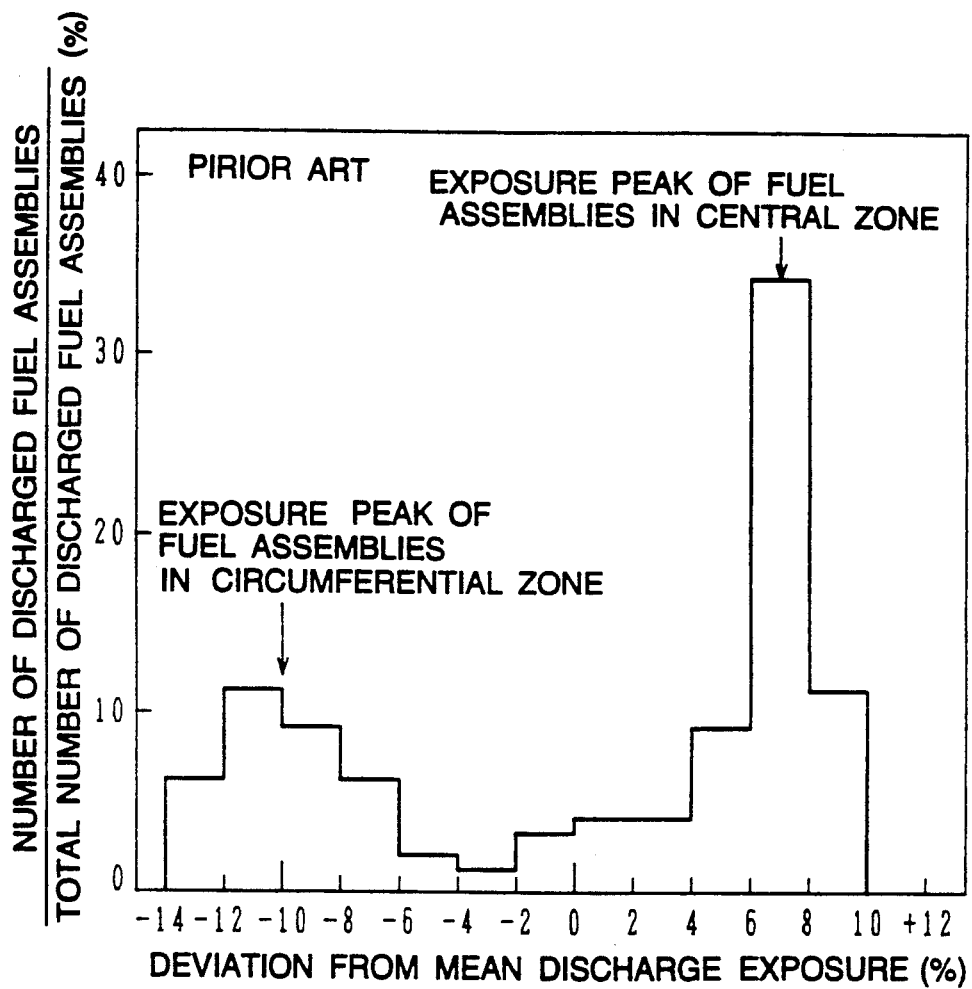
FIG. 13 is a histogram showing discharge exposure according to the fuel loading pattern shown in FIG. 12.

FIG. 13 shows an exposure histogram of the discharged fuel assemblies in the prior art as disclosed in the above-cited JP, A, 56-87891. As will be seen from FIG. 13, the discharged peaking in the disclosed prior art becomes 1.10 which is larger than 1.06 in this embodiment.

Consequently, with this embodiment, since the difference in exposure between the used fuel assemblies is reduced, the number of those fuel assemblies which are taken out of the reactor without reaching a target degree of exposure is lowered to improve fuel economy. Also, the movement of the fuel assemblies during each shuffling step can be mechanically performed because the destined positions are determined in advance, thus making it possible to easily avoid the complicated operation for fuel shuffling.

Further, with this embodiment, since the fuel assemblies having comparable exposure history are always arranged through shuffling at the core positions in the second, third and fourth layers from the core outermost layer, the core radial exposure distribution is less dependent on the operation cycles. Thus the core operation control is facilitated.

Additionally, with this embodiment, since the fuel assemblies of lower exposure are loaded in the second and third layers of the core circumferential zone from the outermost periphery of the core, a mean radial power level in the core circumferential zone can be lowered approximately 2% in comparison with the prior art shown in FIG. 10. On the other hand, mean exposure in the core central zone becomes smaller approximately 1% than that in the prior core, and the core reactivity is improved about 0.1% Dk by utilizing neutron importance. The radial power peaking occurred in the core central zone can also be lowered approximately 2% in comparison with the prior art, thereby increasing thermal allowance.

The core of this embodiment includes both the first cells and the control cells 12 in the core central zone 10, and includes the first cells, but no control cells in the core circumferential zone 11. The core circumferential zone 11 is of a zone where the loaded positions of the fuel assemblies are made different in at least two successive cycles.

If the control cells 12 are arranged in the core circumferential zone 11, the core radial power level would be lowered in the core circumferential zone 11, especially in the vicinity of the control cells 12. Therefore, the fuel assemblies arranged in the core circumferential zone (particularly, the fuel assemblies arranged near the control cells 12) would be so impeded in burning as to leave a larger amount of fissile materials than that in this embodiment when they are moved to the control cells 12 in the core central zone 10. As a result, the mean infinite multiplication factor in the control cells 12 would be larger than that in this embodiment, thereby enlarging a rate of power increase of fuel rods in the control cells 12 during the operation of withdrawing control rods. Such a problem will never be raised in this embodiment.

Furthermore, since fresh fuel assemblies loaded in the core circumferential zone are changed in their loaded positions in the second cycle within the same zone to increase a power level in the area of the core circumferential zone near the core central zone, the 3-cycle residing fuel loaded from the core circumferential zone 11 to the control cells 12 in the core central zone 10 can be effectively burnt. This contributes to a reduction in the exposure difference between the used fuel assemblies.

Second Embodiment

Figure 14:
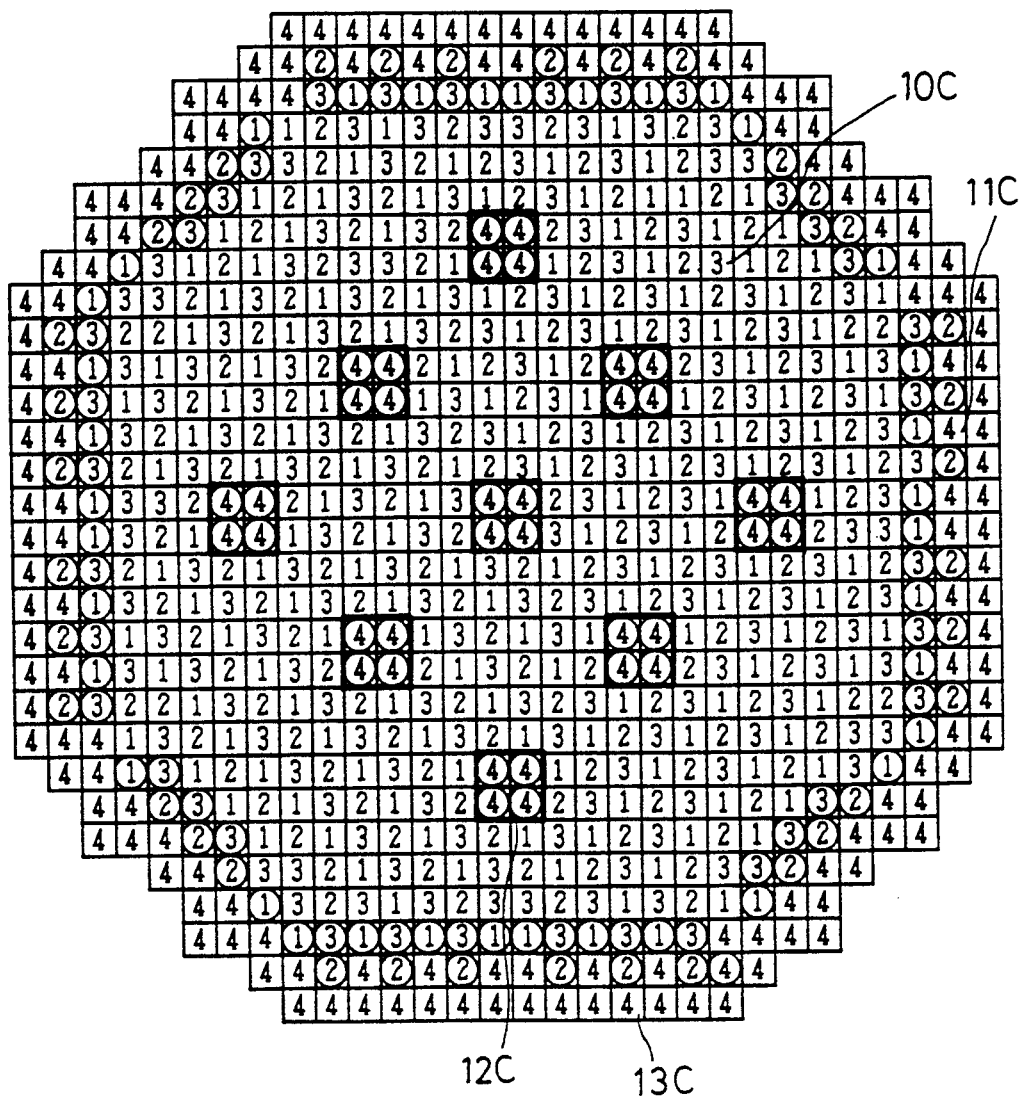
FIG. 14 is a diagram showing a fuel loading pattern during some operation cycle of the reactor core according to a second embodiment of the present invention.

A second embodiment of the present invention will be described below with reference to FIG. 14. In this embodiment, the size of the core circumferential zone surrounding the core central zone including fuel assemblies loaded in an evenly dispersed manner is reduced along with the number of control cells. The layout of control cells 12C shown in FIG. 14 is based on the technical concept of the core arrangement illustrated in FIG. 1 of JP, B, 62-44632. By arranging nine control cells 12C as shown in FIG. 14, power control during the reactor operation can be performed by a smaller number 9 of control rods as described in JP, B, 62-44632. Therefore, the operation of the control rods is remarkably simplified and the core radial power distribution is made flat even in a state of the control rods being fully withdrawn.

The core of this embodiment has the same batch number, i.e., 4.0, as the first embodiment, and comprises a core central zone 10C in which the loaded positions of fuel assemblies remain unchanged for successive two cycles, and a core circumferential zone 11C in which the loaded positions of fuel assemblies are changed for each of successive three cycles.

In this embodiment, because the number of the control cells 12C formed in the core central zone 10C is small and the number of the 3-cycle residing fuel moved from the core central zone 10C to the core circumferential zone 11C is large, the core circumferential zone 11C comprises a part of the second layer and the third layer from the core outermost layer. Taking into account the power peaking of the fuel assemblies present at the boundary between the core circumferential zone 11C and the core central zone 10C, fresh fuel assemblies and the 3-cycle residing fuel are arranged in portions of the core circumferential zone 11C adjacent to the core central zone 10C. Then, the fuel assemblies having resided for two or more cycles, i.e., the 3rd cycle fuels in this embodiment, are arranged in portions of the core central zone 10C adjacent to the fresh fuel assemblies in the core circumferential zone 11C. Therefore, the fuel assemblies dispersedly loaded in the core central zone 10C are stayed at the same positions for two cycles and then moved in the third cycle to the positions where the 3rd cycle fuel has resided in FIG. 14. The positions made vacant upon the above movement are filled by loading fresh fuel assemblies. The thus-moved fuel assemblies are stayed there for one cycle, followed by moving and loading to the core outermost layer 13C and a part of the second layer.

In the core circumferential zone 11C, the fuel assemblies in the third layer from the outermost layer are subjected to the first and third cycle operations, and the fuel assemblies in the second layer from the outermost layer are subjected to the second cycle operation. Thus, any fuel assemblies in the core circumferential zone 11C experience the respective operation cycles at substantially the same radial distance across the core.

As explained above, this embodiment also employs the aforesaid basic procedures (A), (B) and additional procedure (C). Stated otherwise, even when the number of the control cells 12 in the core central zone is different from that in the first embodiment, it is possible to apply this embodiment and reduce the difference in exposure between the discharged fuel assemblies. The ratio of maximum discharge exposure to mean discharge exposure, i.e., the exposure peaking, in this embodiment is on the same order as the first embodiment, i.e., 1.06. The advantages of the first embodiment are also obtainable with this embodiment. Further, since the core central zone 10C in this embodiment is wider than the first embodiment, the number of fuel assemblies to be moved in the shuffling steps is lessened.

Another advantage of this embodiment is that all the control cells 12C are remote from the core circumferential zone 11C and face to the first cells, fissile materials contained in the 3rd cycle residing fuel moved from the core circumferential zone 11C to the control cells 12C can be effectively utilized.

Third Embodiment

Figure 15:
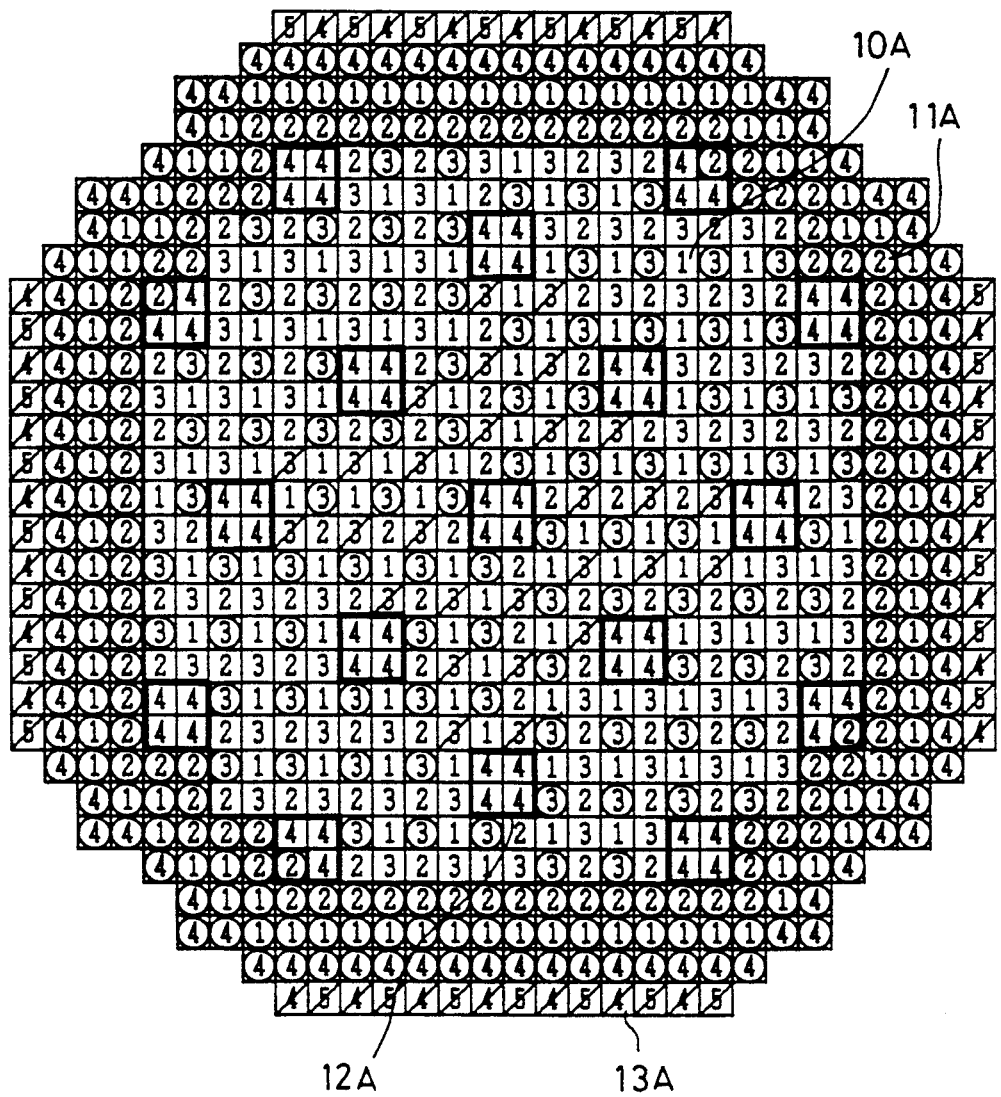
FIG. 15 is a diagram showing a fuel loading pattern during some operation cycle of the reactor core according to a third embodiment of the present invention.

A third embodiment of the present invention will be described below with reference to FIGS. 15 to 17. In this embodiment, the fuel assemblies loaded in a core circumferential zone 11A are evenly shuffled into a core central zone 10A after residing for two cycles. A core of this embodiment has the batch number of 4.2.

Fuel shuffling in this embodiment will now be explained by referring to FIGS. 16 and 17. First, the 3-cycle residing fuels are shuffled as follows:

(1) Among the fuel assemblies loaded in the core central zone 10A, those ones present in a peripheral portion of the zone 10A are moved to control cells 12A in the core central zone 10A after residing there for three cycles (see FIG. 16(a));

(2) Among the fuel assemblies loaded in the core central zone 10A, those ones present in a center portion of the zone 10A are moved to an outermost layer 13A after residing there for three cycles (see FIG. 16(b)); and (3) The 3-cycle residing fuels having moved to the core central zone 10A from the core circumferential zone 11A are moved to the second layer from the core outermost layer 13A after residing in the core central zone 10A for one cycle (see FIG. 17(a)).

Then, the 1- and 2-cycle residing fuels in the core circumferential zone 11A are shuffled as follows:

(4) The 2-cycle residing fuels present in the core circumferential zone 11A are moved to the core central zone 10A to be dispersedly loaded therein (see FIG. 17(b)); and (5) The 1-cycle residing fuels are moved to the positions where the 2-cycle residing fuels have existed, i.e., the fourth layer from the core outermost layer (see FIG. 17(c)).

Further, the 4-cycle residing fuels in the core outermost layer 13A are moved to another location in the same layer 13A (see FIG. 16(c)). The 4-cycle residing fuels in the control cells 12A and the 5-cycle residing fuels arranged in the core outermost layer 13A are taken out of the reactor core. Fresh fuel assemblies are loaded to the positions in the core central zone 10A where the 3-cycle residing fuel has existed. The 4-cycle residing fuels in the second layer from the core outermost layer 13A are also taken out of the reactor core. Other fresh fuel assemblies are loaded to the positions in the third layer from the core outermost layer 13A where the 1-cycle residing fuels have existed.

Of the above procedures, the procedure of moving the 1-cycle residing fuels to the fourth layer from the core outermost layer corresponds to the aforesaid basic procedure (A), thereby reducing the difference in exposure due to a different radial power level in the vicinity of the core boundary (or in the core circumferential zone), i.e., the aforesaid exposure difference (a). Also, the procedure of moving the 2-cycle residing fuels in the core circumferential zone 11A to the core central zone 10A to be dispersedly loaded therein corresponds to the aforesaid basic procedure (B), thereby reducing the difference in exposure between the fuel assemblies having resided in the core central zone and the fuel assemblies having resided in the circumferential zone due to different radial power levels between the core central zone and the core circumferential zone, i.e., the aforesaid exposure difference (b). Further, the procedure of moving the fuel assemblies loaded in a peripheral portion of the core central zone 10A to the control cells after residing for three cycles corresponds to the aforesaid additional procedure (D). The procedure of moving the fuel assemblies loaded in a center portion of the core central zone 10A to the core outer most layer 13A after residing for three cycles corresponds to the aforesaid additional procedure (C). The above exposure difference (b) is further reduced with the last two procedures.

Additionally, in this embodiment, since the fuel assemblies loaded in the core circumferential zone 11A are all successively moved to the same positions in the second, third and fourth layers from the core outermost layer 13A through fuel exchange, all of the fuel assemblies have the same exposure history, implying that the difference in exposure between the fuel assemblies loaded in the core circumferential zone is necessarily reduced. Also, since the fuel assemblies loaded in the core circumferential zone are stayed there for two cycles and then moved out of the fourth layer from the core outermost layer 13A to the core central zone 10A located at the center and having a higher relative power level, there can be obtained a large increase in exposure as with the case of moving the fuel assemblies to the fourth layer in the first embodiment.

With the above fuel shuffling, the ratio of maximum discharge exposure to mean discharge exposure (i.e., the exposure peaking) in this embodiment is 1.08, enabling the difference in discharge exposure between the fuel assemblies to be smaller than conventionally. Moreover, the radial exposure distribution across the core is less dependent on the operation cycles and the core operation control is facilitated.

Additionally, with this embodiment, since the fuel assemblies of higher exposure are concentratedly loaded in the core outermost layer 13A and the second layer from the core outermost layer, it is possible to reduce leak of neutrons from the core.

Fourth Embodiment

Figure 18:
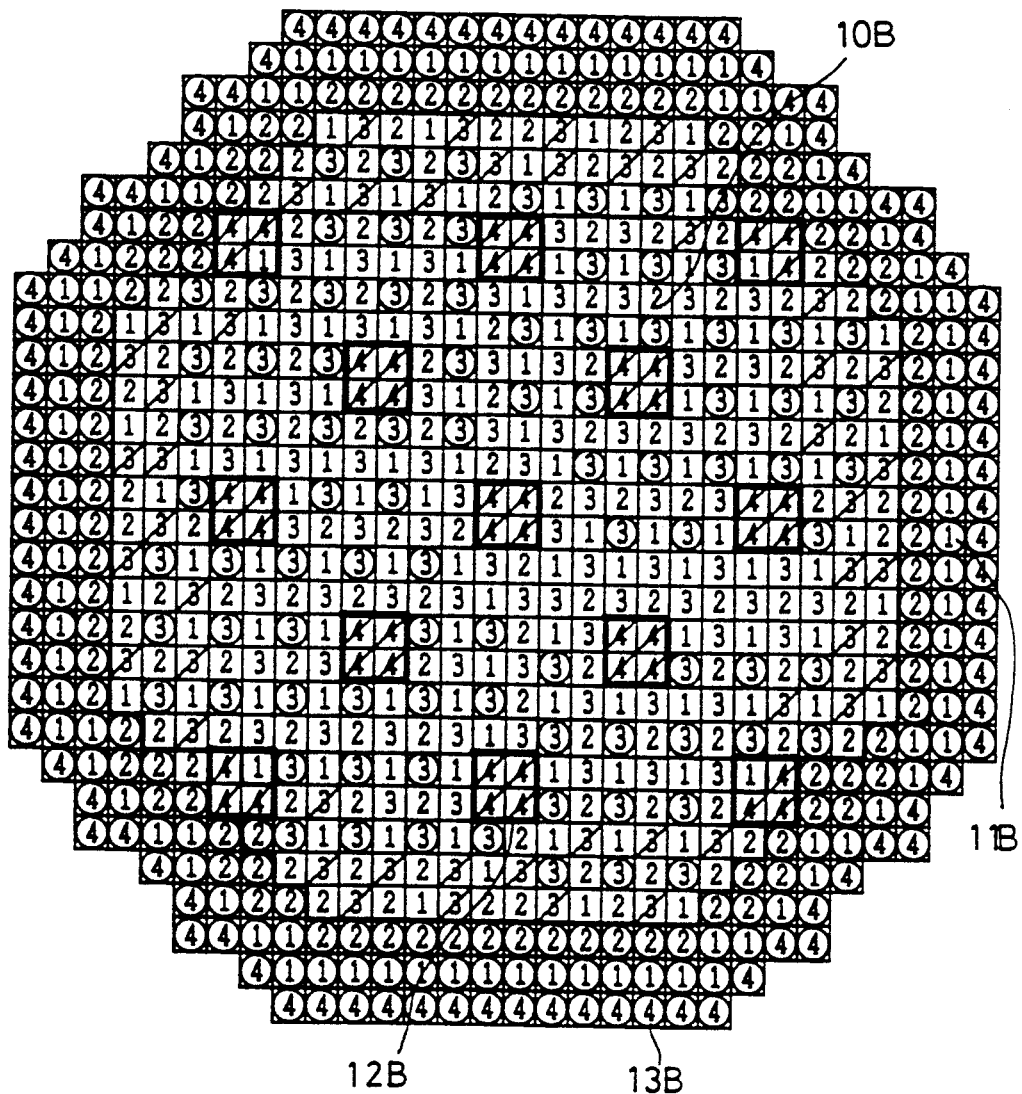
FIG. 18 is a diagram showing a fuel loading pattern during some operation cycle of the reactor core according to a fourth embodiment of the present invention.

A fourth embodiment of the present invention will be described below with reference to FIG. 18. A core of this embodiment has the batch number of 3.7 different from that of the second embodiment. The 2-cycle residing fuel in a core circumferential zone 11B is moved to a core central zone 10B to be dispersedly loaded therein as with the second embodiment. As to the 3-cycle residing fuels in the core central zone 10B, the 3-cycle residing fuels in its peripheral portion, indicated by slant lines in the drawing, are shuffled to control cells 12B and the 3-cycle residing fuels in its center portion are taken out of the reactor core. In the core circumferential zone 11B, fresh fuel assemblies are loaded in the second layer from an outermost layer 13B, and the 1-cycle residing fuel is moved to the third layer from the outermost layer 13B. The fuel assemblies having been moved to the core central zone 10B to be dispersedly loaded therein are stayed there for one cycle and then moved to the outermost layer 13B.

Thus, this embodiment also employs the aforesaid basic procedures (A), (B) and additional procedure (D).

The ratio of maximum discharge exposure to mean discharge exposure (i.e., the exposure peaking) in this embodiment is comparable to that in the second embodiment, i.e., 1.08, enabling the difference in discharge exposure between the fuel assemblies to be smaller than conventionally.

It is to be noted that, in the foregoing embodiments, exposure of the fuel assemblies discharged from the core central zone may be controlled by utilizing cross-shaped control rods, which are inserted in the control cells, to control a relative power level in the core central zone.

Further, shifting the core of the usual pattern shown in FIG. 11, where fuel assemblies are loaded in an evenly dispersed manner, to the core of any of the foregoing embodiments may be achieved by once taking the fuel assemblies in the core circumferential zone out of the reactor core and then loading them into the core again in the order of cycles experienced.

While the foregoing embodiments have been explained by taking a boiling water reactor as an example, the present invention is also applicable to other cores of a light-water reactor and a fast breeder reactor.

According to the present invention, as described above, the difference in discharge exposure between used fuel assemblies can be reduced and thus fuel economy is improved. It is also possible to avoid the complicated operation for fuel shuffling. Additionally, the core operation control is facilitated because similar core operation characteristics can be obtained in successive operation cycles.

What is claimed is:

1. A fuel loading method for a reactor core having a core central zone including a plurality of first fuel assemblies that remain at the same loaded positions for at least two successive cycles, and a core circumferential zone including a plurality of second fuel assemblies that are changed in loaded positions for each of at least two successive cycles, said method comprising:
   (a) a first step of taking out said second fuel assemblies having resided in said core circumferential zone for at least two cycles; and
   (b) a second step of moving said taken-out second fuel assemblies to said core central zone.

2. A fuel loading method for a reactor core according to claim 1, further comprising:
   (c) a third step of moving said second fuel assemblies having resided in a first area of two layers adjacent to each other in said core circumferential zone for one cycle to a second area of said two layers.

3. A fuel loading method for a reactor core according to claim 2, further comprising:
   (d) a step of moving said second fuel assemblies having resided in said two layers adjacent to each other for two cycles to an inner layer adjacent to said two layers in said core circumferential zone.

4. A fuel loading method for a reactor core according to claim 1, wherein said second fuel assemblies having resided in one of two layers adjacent to each other in said core circumferential zone for one cycle are moved to the other of said two layers.

5. A fuel loading method for a reactor core according to claim 4, wherein the one of said two layers is an outer layer of said two layers and the other of said two layers is an inner layer of said two layers.

6. A fuel loading method for a reactor core according to claim 2, further comprising:
   (e) a step of moving said second fuel assemblies having resided in said second area for one cycle to a third area of said two layers.

7. A fuel loading method for a reactor core according to claim 6, wherein said first and third areas are located in the inner layer of said two layers and said second area is located in the outer layer of said two layers.

8. A fuel loading method for a reactor core according to claim 1 or 3, wherein a plurality of first cells each including four fuel assemblies disposed adjacent to each other and a plurality of second cells each including four other fuel assemblies disposed adjacent to each other and having a mean neutron infinite multiplication factor smaller than a mean neutron infinite multiplication factor of said first cells are arranged in said core central zone, said second cells being control cells, and wherein second step includes a step of moving said second fuel assemblies to said control cells.

9. A fuel loading method for a reactor core according to claim 3, further comprising:
   (f) a step of moving said first fuel assemblies having resided in said core central zone for three cycles to a core outermost layer.

10. A fuel loading method for a reactor core according to claim 6, wherein a plurality of first cells each including four fuel assemblies disposed adjacent to each other and a plurality of second cells each including four other fuel assemblies disposed adjacent to each other and having a mean neutron infinite multiplication factor smaller than a mean neutron infinite multiplication factor of said first cells are arranged in said core central zone, said second cells being control cells, and wherein said second step includes a step of moving said second fuel assemblies to said control cells.

11. A fuel loading method for a reactor core according to claim 3 or 10, further comprising:
   (g) a step of moving said first fuel assemblies having resided in said central zone for three cycles to a core outermost layer and an inner layer adjacent to said core outermost layer.

12. A fuel loading method for a reactor core according to claim 3, wherein said second step includes a step of dispersedly loading said second fuel assemblies in said core central zone.

13. A fuel loading method for a reactor core according to claim 1 or 12, wherein a plurality of first cells each including four fuel assemblies disposed adjacent to each other and a plurality of second cells each including four other fuel assemblies disposed adjacent to each other and having a mean neutron infinite multiplication factor smaller than a mean neutron infinite multiplication factor of said first cells are arranged in said core central zone, said second cells being control cells and further comprising:
   (h) a step of moving a part of said first fuel assemblies having resided in said core central zone for three cycles to said control cells, and moving the remaining to a core outermost layer.

14. A fuel loading method for a reactor core according to claim 6, wherein said second step includes a step of dispersedly loading said second fuel assemblies in said core central zone.

15. A fuel loading method for a reactor core according to claim 14, wherein a plurality of first cells each including four fuel assemblies disposed adjacent to each other and a plurality of second cells each including four other fuel assemblies disposed adjacent to each other and having a mean neutron infinite multiplication factor smaller than a mean neutron infinite multiplication factor of said first cells are arranged in said core central zone, said second cells being control cells and further comprising:
   (i) a step of moving a part of said first fuel assemblies having resided in said core central zone for three cycles to said control cells, and moving the remaining to a core outermost layer; and
   (j) a step of moving said second fuel assemblies having been dispersedly loaded in said core central zone in said second step and having resided in said core central zone for one cycle to an outer layer adjacent to said two adjacent layers in said core circumferential zone.

16. A fuel loading method for a reactor core according to claim 8, further comprising:
   (f) a step of moving said first fuel assemblies having resided in said core central zone for three cycles to a core outermost layer.

17. A reactor core constructed by the fuel loading method according to claim 8.

18. A fuel loading method for a reactor core having a core central zone including a plurality of first fuel assemblies that remain at the same loaded positions for at least two successive cycles, and a core circumferential zone including a plurality of second fuel assemblies that are changed in loaded positions for each of at least two successive cycles, wherein:
   said second fuel assemblies are moved from said core circumferential zone to said core central zone so that a ratio of maximum discharge exposure to mean discharge exposure is not higher than 1.08.

19. A fuel loading method for a reactor core according to claim 18, wherein said second fuel assemblies are those fuel assemblies having resided in said core circumferential zone for at least two successive cycles.

20. A fuel loading method for a reactor core according to claim 19, wherein a plurality of first cells each including four fuel assemblies disposed adjacent to each other and a plurality of second cells each including four other fuel assemblies disposed adjacent to each other and having a mean neutron infinite multiplication factor smaller than a mean neutron infinite multiplication factor of said first cells, are arranged in said core central zone, said second cells being control cells, and wherein said moved second fuel assemblies are arranged in said control cells.

21. A fuel loading method for a reactor core according to claim 19, wherein said moved second fuel assemblies are dispersedly loaded in said core central zone.

22. A fuel loading method for a reactor core according to claim 19 or 20, wherein said first fuel assemblies having resided in said core central zone for three cycles are moved to at least a core outermost layer.

23. A fuel loading method for a reactor core having a core central zone including a plurality of first fuel assemblies that remain at the same loaded positions for at least two successive cycles, and a core circumferential zone including a plurality of second fuel assemblies that are changed in loaded positions for each of at least two successive cycles, wherein a plurality of first cells each including four fuel assemblies disposed adjacent to each other and a plurality of second cells each including four other fuel assemblies disposed adjacent to each other and having a mean neutron infinite multiplication factor smaller than a mean neutron infinite multiplication factor of said first cells, are arranged in said core central zone, said second cells being control cells, said method comprising:
 (a) a first step of moving said second fuel assemblies having resided in said core circumferential zone for three cycles to said control cells; and
 (b) a second step of moving said first fuel assemblies having resided in said core central zone for three cycles to at least a core outermost zone.

24. A fuel loading method for a reactor core according to claim 23, further comprising:
 (c) a third step of moving said second fuel assemblies having resided in a first area of two layers adjacent to each other in said core circumferential zone for one cycle to a second area of said two layers.

25. A fuel loading method for a reactor core according to claim 24, further comprising:
 (d) a step of moving said second fuel assemblies having resided in said second area for one cycle to a third area of said two layers.

26. A fuel loading method for a reactor core according to claim 25, wherein said first and third areas are located in an inner layer of said two layers and said second area is located in an outer layer of said two layers.

27. A reactor core constructed by the fuel loading method according to claim 23.

28. A reactor core constructed by the fuel loading method according to claim 23.

29. A reactor core constructed by the fuel loading method according to claim 18.

* * * * *